US012621567B2

(12) United States Patent
Takao et al.

(10) Patent No.: US 12,621,567 B2
(45) Date of Patent: May 5, 2026

(54) APPARATUS AND METHOD EXECUTED BY APPARATUS

(71) Applicant: CANON KABUSHIKI KAISHA, Tokyo (JP)

(72) Inventors: Yumi Takao, Chiba (JP); Nobutaka Mizuno, Tokyo (JP); Junichi Imamiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 18/792,319

(22) Filed: Aug. 1, 2024

(65) Prior Publication Data

US 2024/0397202 A1     Nov. 28, 2024

Related U.S. Application Data

(63) Continuation of application No. 18/325,892, filed on May 30, 2023, now Pat. No. 12,088,915, which is a continuation of application No. 17/835,844, filed on Jun. 8, 2022, now Pat. No. 11,924,548.

(30) Foreign Application Priority Data

Jun. 11, 2021     (JP) ................................. 2021-098165

(51) Int. Cl.
*H04N 23/67*          (2023.01)
*H04N 23/63*          (2023.01)
(52) U.S. Cl.
CPC ......... *H04N 23/672* (2023.01); *H04N 23/635* (2023.01)

(58) Field of Classification Search
CPC .. H04N 23/672; H04N 23/635; H04N 13/218; H04N 23/698
See application file for complete search history.

(56) References Cited

U.S. PATENT DOCUMENTS

| | | | | |
|---|---|---|---|---|
| 8,760,567 B2 * | 6/2014 | Hamamura | ............ | H04N 23/45 348/349 |
| 2012/0154670 A1 * | 6/2012 | Hamamura | .......... | H04N 13/296 348/E5.045 |
| 2013/0021442 A1 * | 1/2013 | Okamoto | ............... | G03B 17/18 348/46 |
| 2013/0250062 A1 * | 9/2013 | Tin | ........................ | H04N 13/122 348/46 |
| 2022/0400243 A1 * | 12/2022 | Shoji | ...................... | H04N 23/60 |
| 2023/0300461 A1 * | 9/2023 | Takao | .................. | H04N 13/218 348/349 |

FOREIGN PATENT DOCUMENTS

| | | |
|---|---|---|
| JP | 2013046292 A | 3/2013 |
| JP | 2015041024 A | 3/2015 |

* cited by examiner

*Primary Examiner* — Shahbaz Nazrul
(74) *Attorney, Agent, or Firm* — Canon U.S.A., Inc. IP Division

(57)     ABSTRACT

An apparatus comprising a sensor capable of generating a signal pair used in focus detection. The apparatus obtains, based on a defocus amount obtained using the signal pair, a focus distance of a lens unit that is mounted to the apparatus and adjusts a focus distance of the lens unit based on the obtained focus distance. When the lens unit is a multi-scopic lens unit having a plurality of optical systems having different axes, the apparatus obtains the focus distance using an adjustment value obtained based on an axis position that is a position on the sensor through which an axis of the multi-scopic lens unit passes.

14 Claims, 23 Drawing Sheets

FIG. 5

F I G. 6
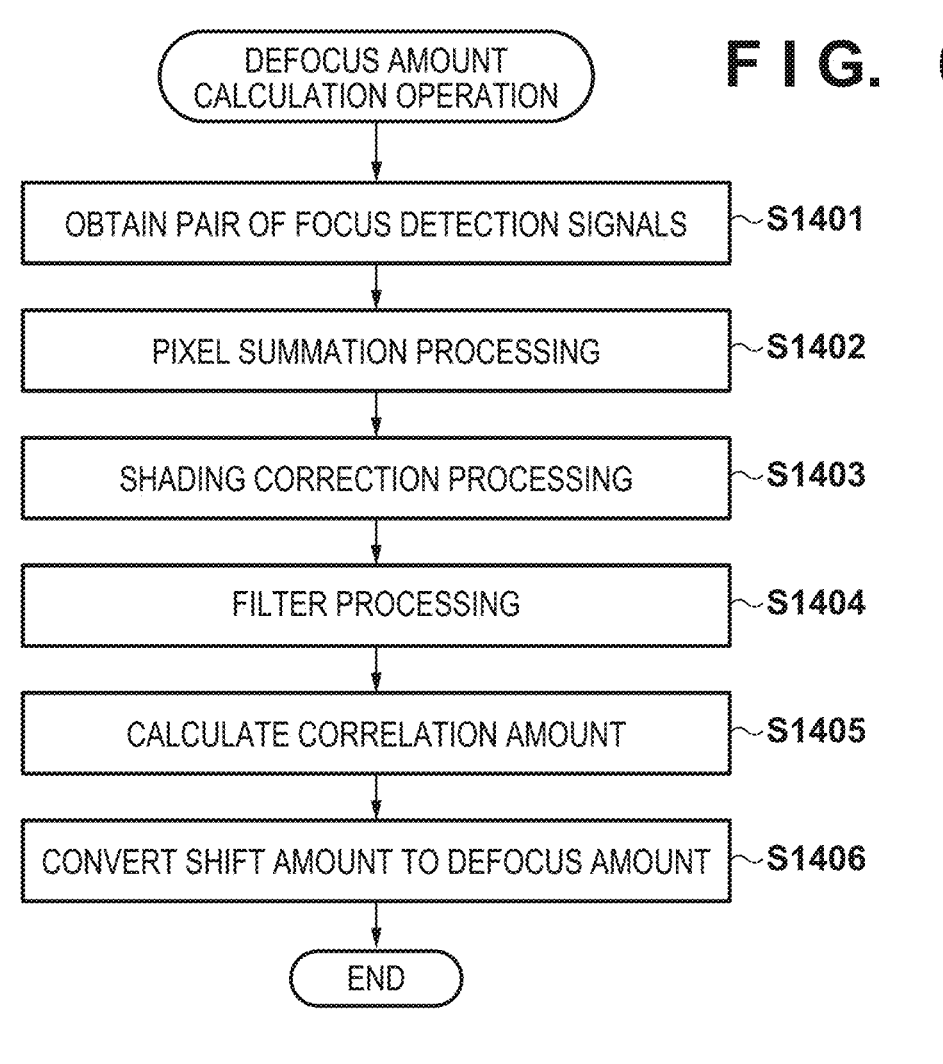
```
        DEFOCUS AMOUNT
      CALCULATION OPERATION
  OBTAIN PAIR OF FOCUS DETECTION SIGNALS    S1401
  PIXEL SUMMATION PROCESSING               S1402
  SHADING CORRECTION PROCESSING            S1403
  FILTER PROCESSING                        S1404
  CALCULATE CORRELATION AMOUNT             S1405
  CONVERT SHIFT AMOUNT TO DEFOCUS AMOUNT   S1406
              END
```
F I G. 7
OPTICAL AXIS CENTER 1          OPTICAL AXIS CENTER 2
IMAGE SENSOR CENTER

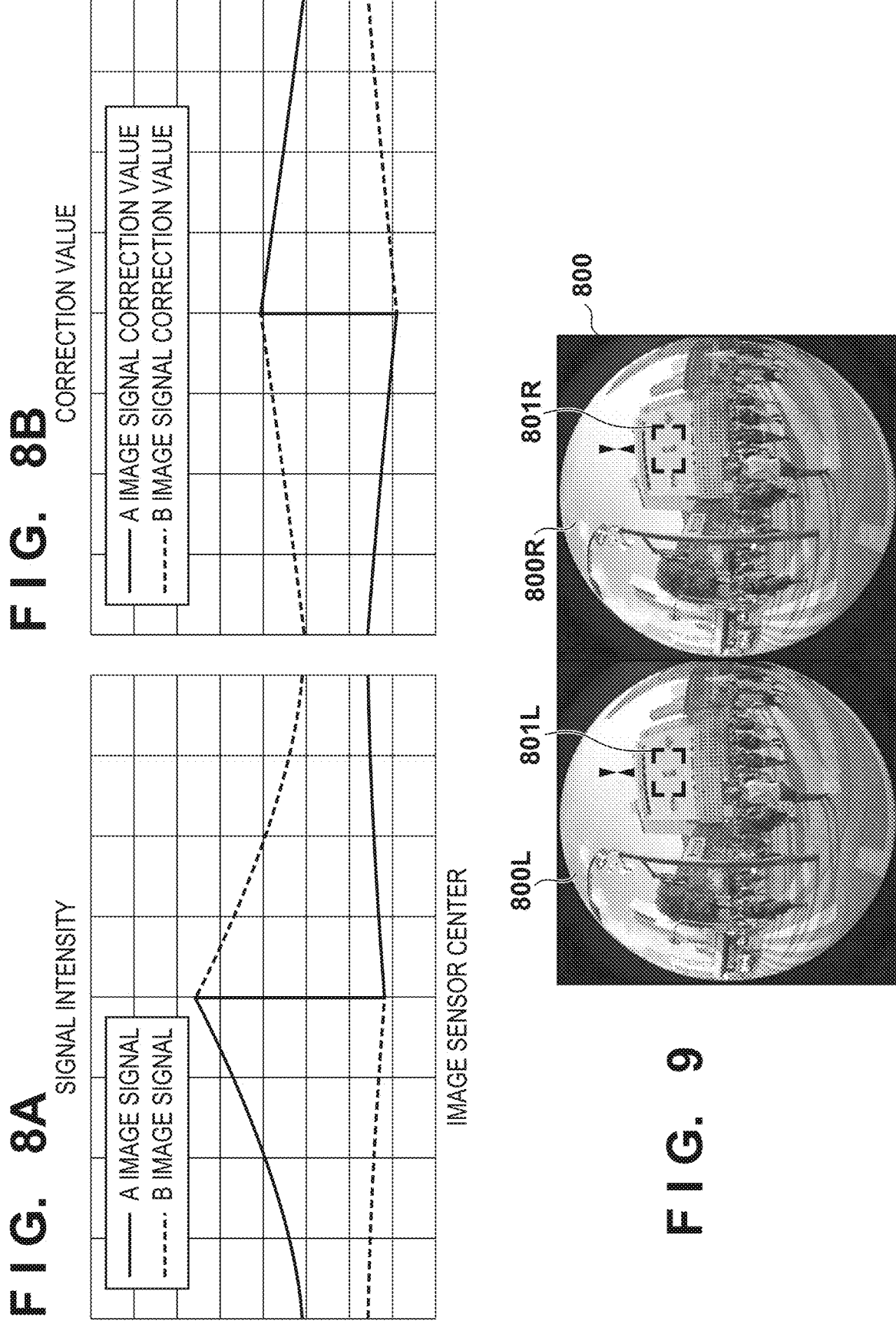

F I G.   10A
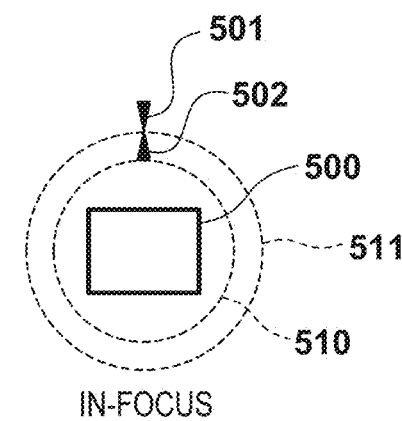
IN-FOCUS
F I G.   10B
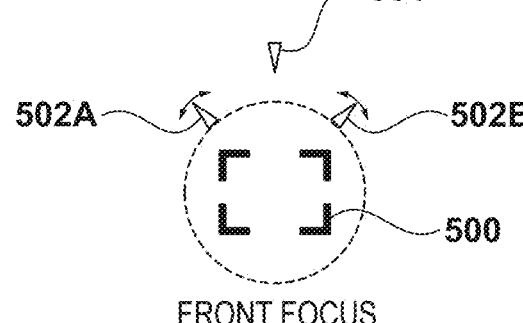
FRONT FOCUS
F I G.   10C
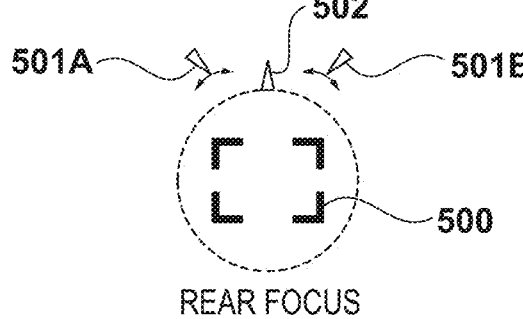
REAR FOCUS
F I G.   10D
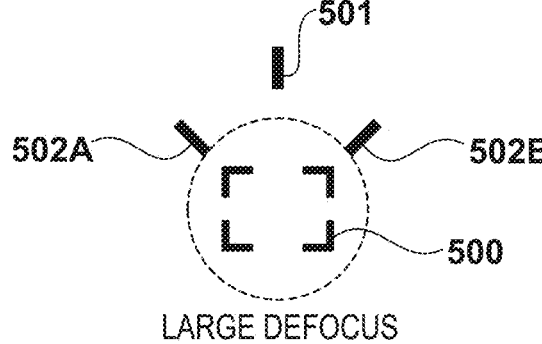
LARGE DEFOCUS

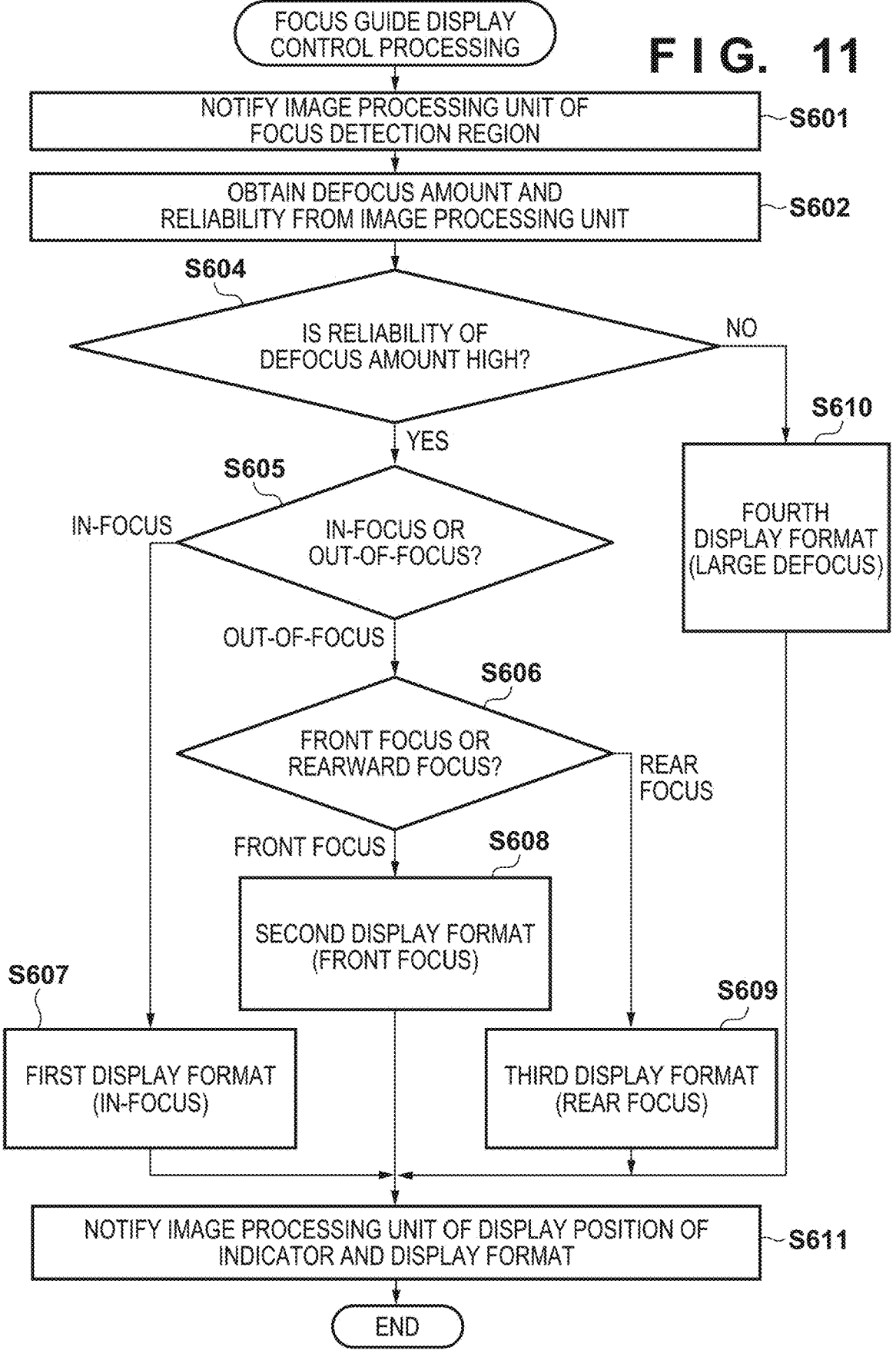

F I G. 11

FOCUS GUIDE DISPLAY CONTROL PROCESSING

NOTIFY IMAGE PROCESSING UNIT OF FOCUS DETECTION REGION — S601

OBTAIN DEFOCUS AMOUNT AND RELIABILITY FROM IMAGE PROCESSING UNIT — S602

S604

IS RELIABILITY OF DEFOCUS AMOUNT HIGH?

NO

S610

YES

S605

IN-FOCUS OR OUT-OF-FOCUS?

IN-FOCUS

FOURTH DISPLAY FORMAT (LARGE DEFOCUS)

OUT-OF-FOCUS

S606

FRONT FOCUS OR REARWARD FOCUS?

REAR FOCUS

FRONT FOCUS          S608

SECOND DISPLAY FORMAT (FRONT FOCUS)

S607

S609

FIRST DISPLAY FORMAT (IN-FOCUS)

THIRD DISPLAY FORMAT (REAR FOCUS)

NOTIFY IMAGE PROCESSING UNIT OF DISPLAY POSITION OF INDICATOR AND DISPLAY FORMAT — S611

END

F I G. 12
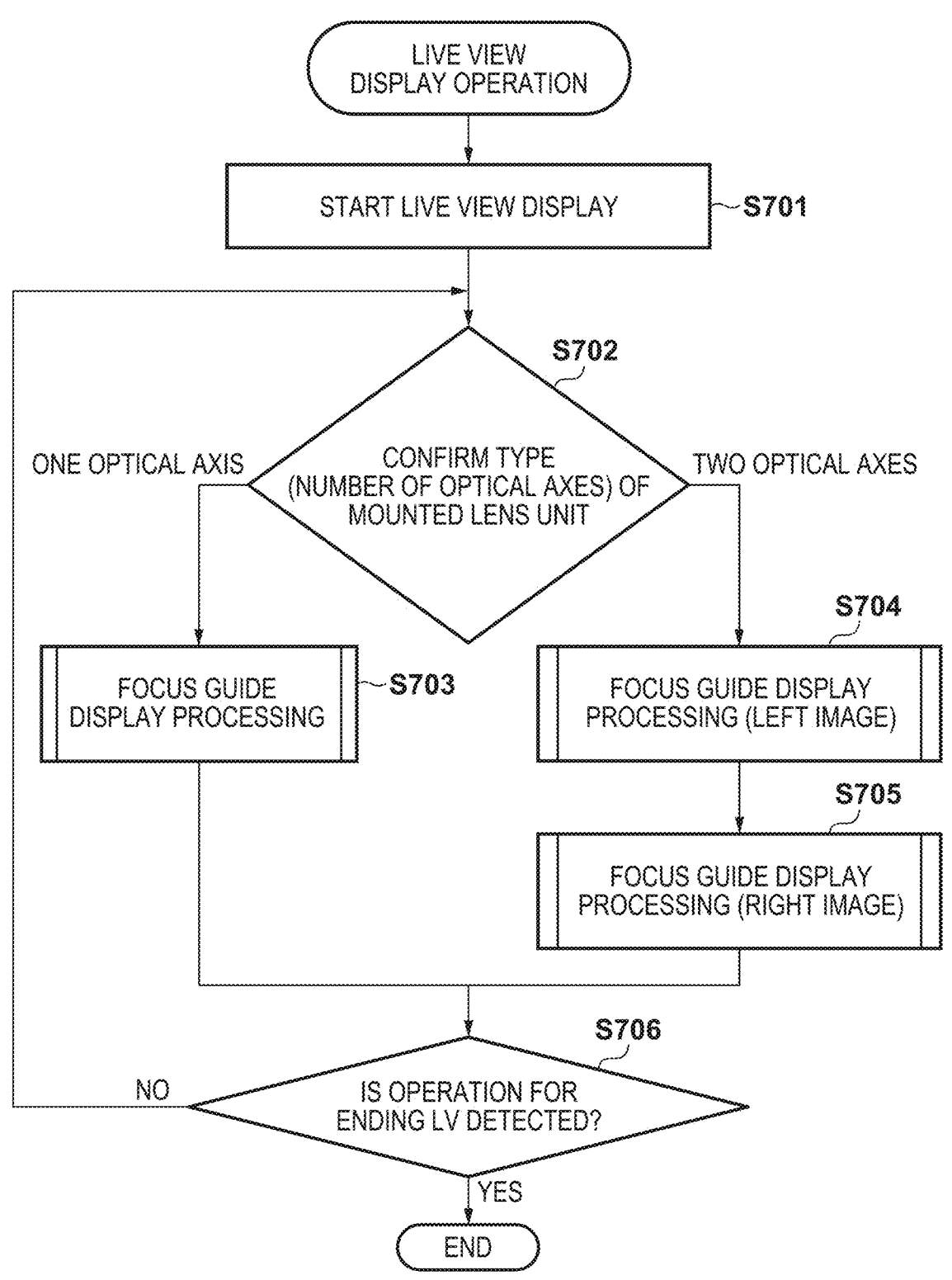

NO DIFFERENCE

DIFFERENCE +

DIFFERENCE −

LARGE DEFOCUS

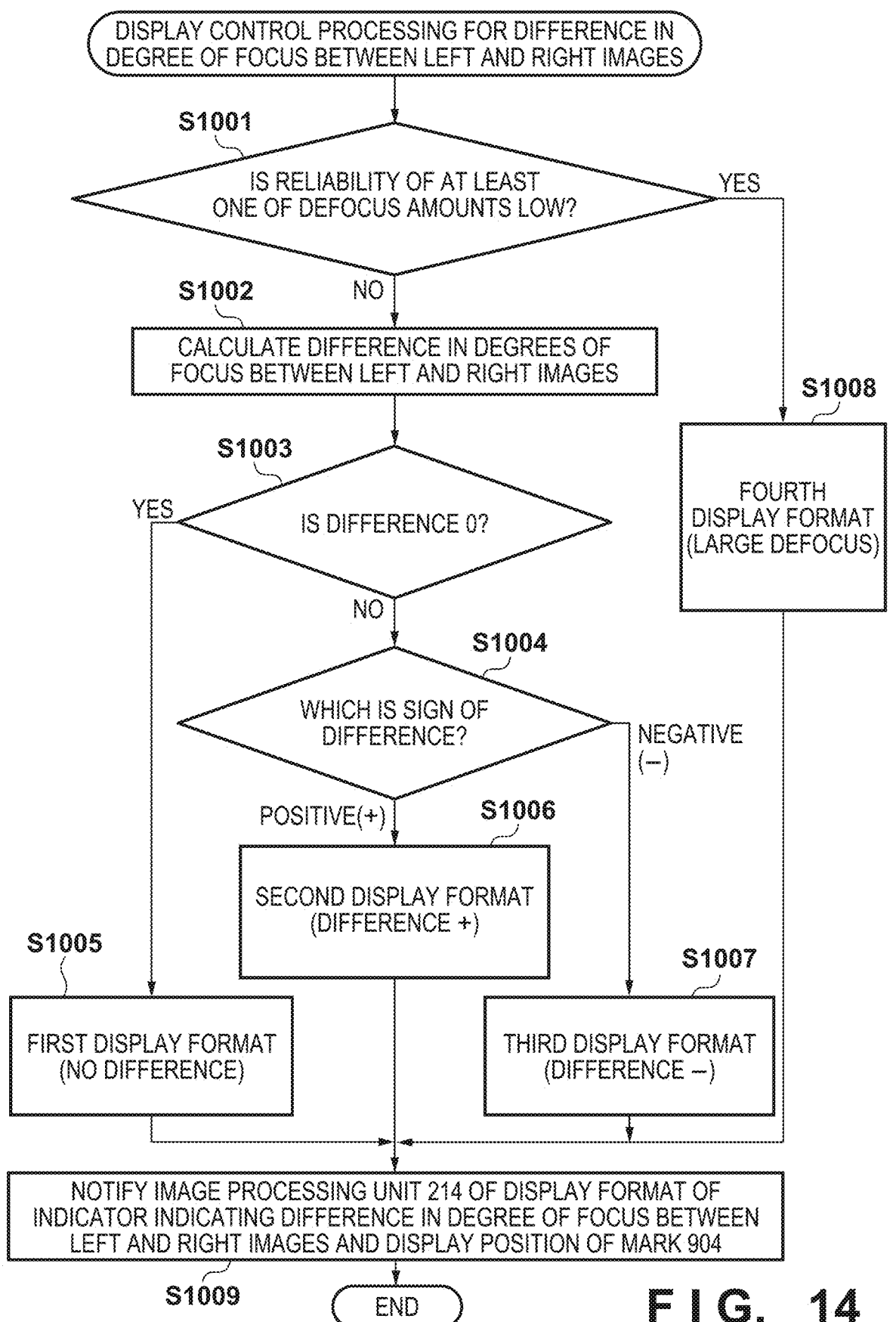
F I G. 14

F I G.  16
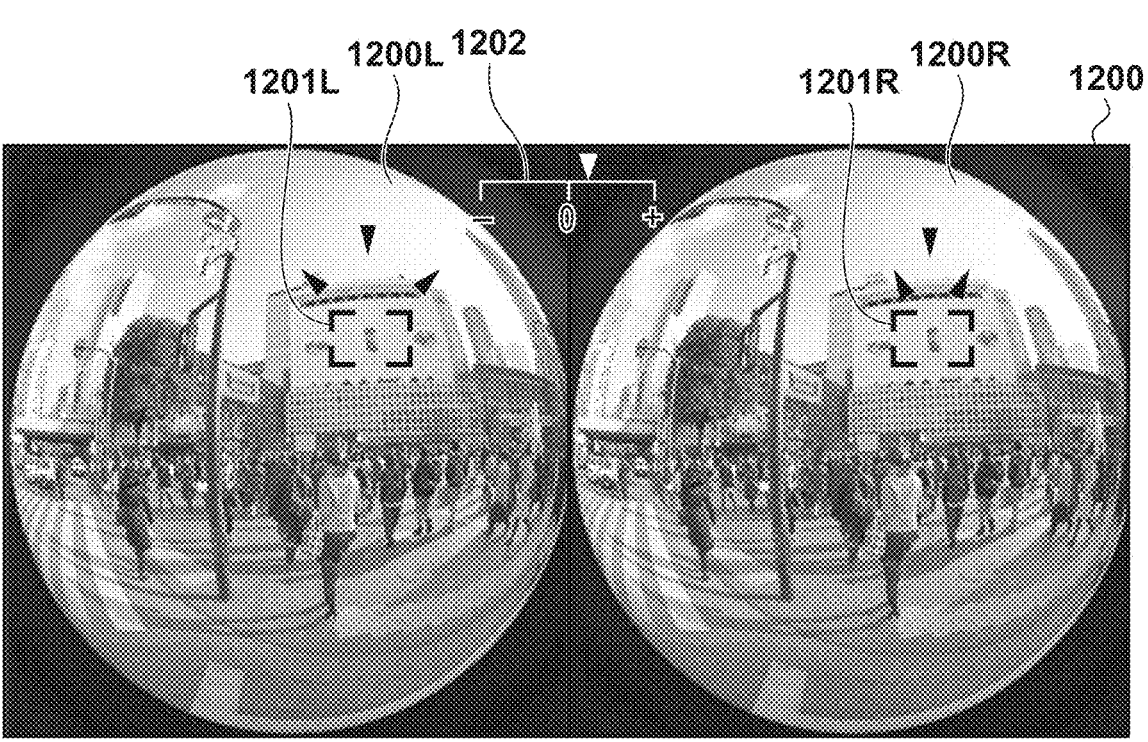

F I G. 17A
NO DIFFERENCE-IN-FOCUS
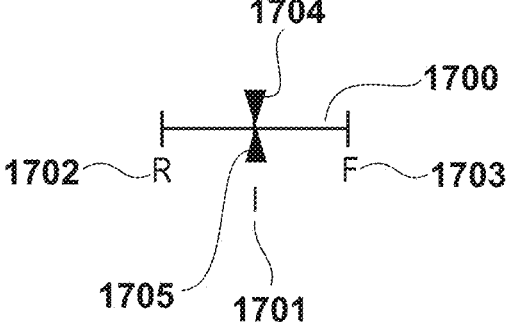
F I G. 17B
NO DIFFERENCE-FRONT FOCUS
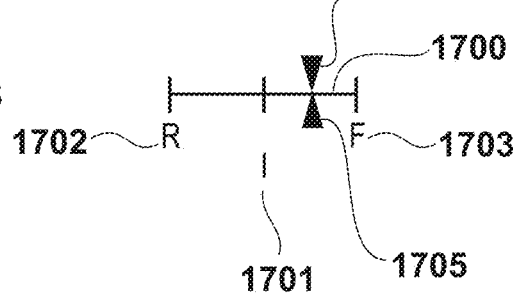
F I G. 17C
DIFFERENCE
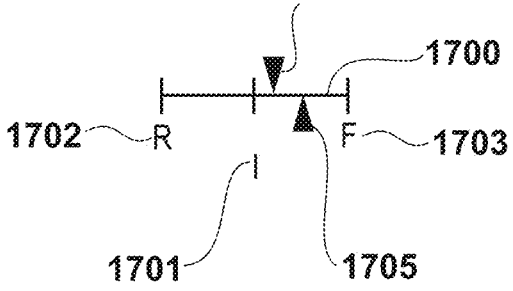
F I G. 17D
LARGE DEFOCUS

F I G. 18
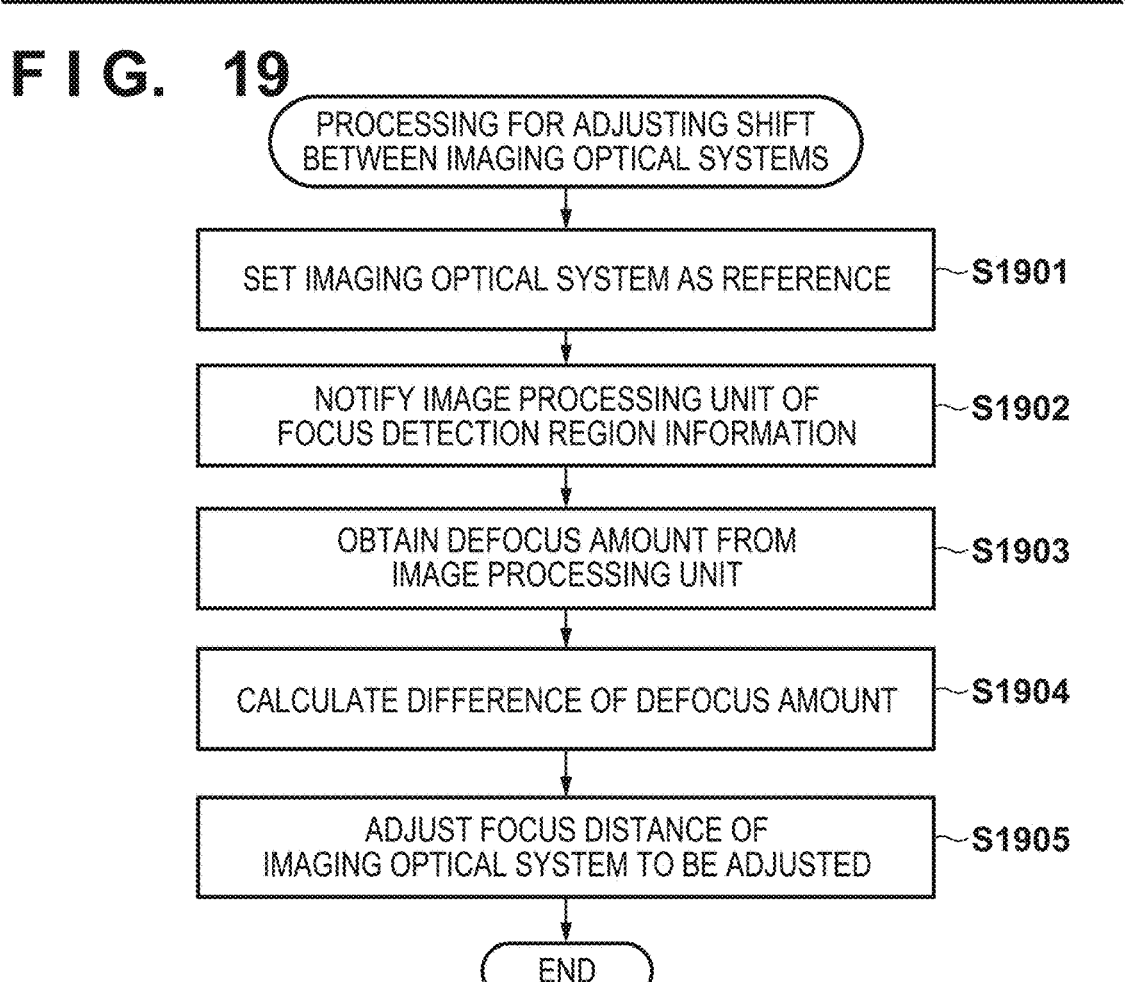
F I G. 19
PROCESSING FOR ADJUSTING SHIFT
BETWEEN IMAGING OPTICAL SYSTEMS
SET IMAGING OPTICAL SYSTEM AS REFERENCE — S1901
NOTIFY IMAGE PROCESSING UNIT OF
FOCUS DETECTION REGION INFORMATION — S1902
OBTAIN DEFOCUS AMOUNT FROM
IMAGE PROCESSING UNIT — S1903
CALCULATE DIFFERENCE OF DEFOCUS AMOUNT — S1904
ADJUST FOCUS DISTANCE OF
IMAGING OPTICAL SYSTEM TO BE ADJUSTED — S1905
END

F I G.  20A
ONLY LEFT IS OUT-OF- FOCUS
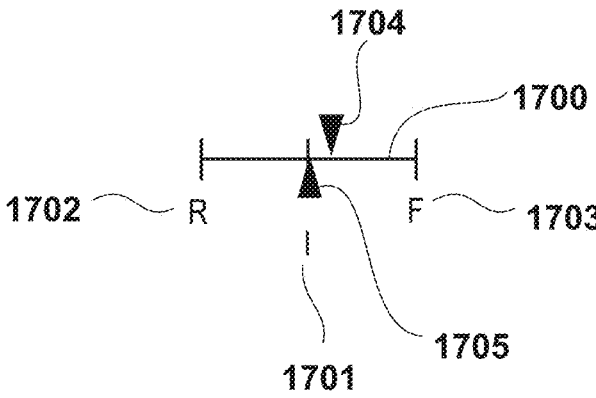
F I G.  20B
IN-FOCUS
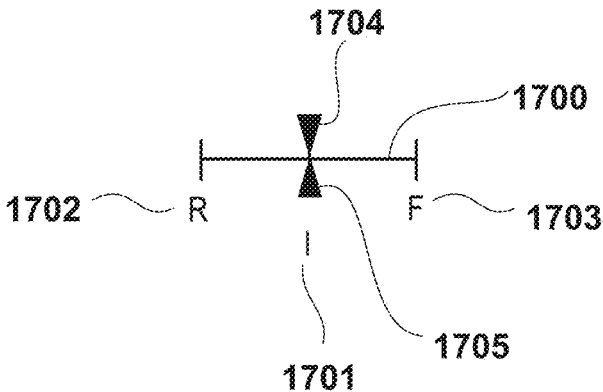

F I G. 21A
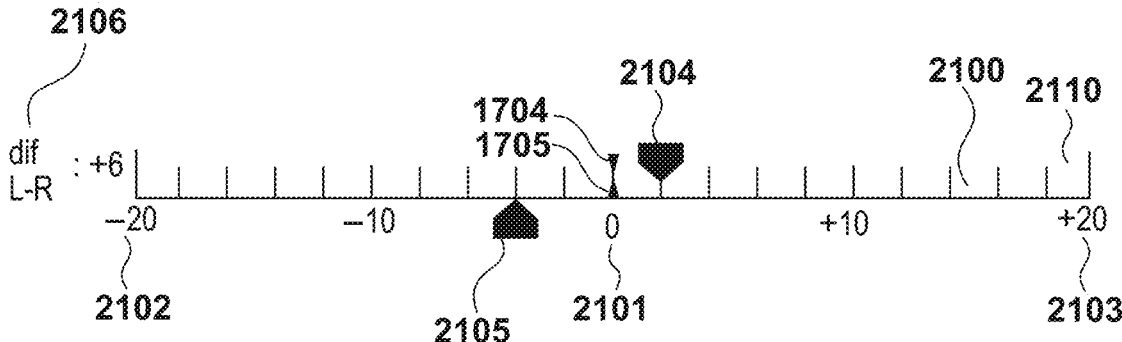
F I G. 21B
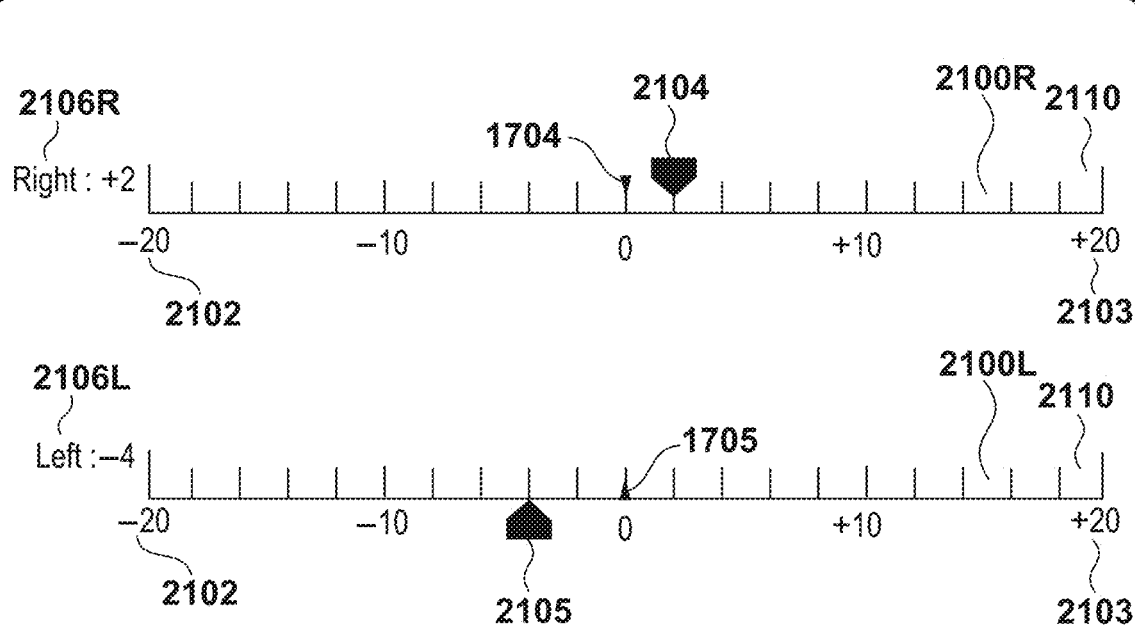
F I G. 21C
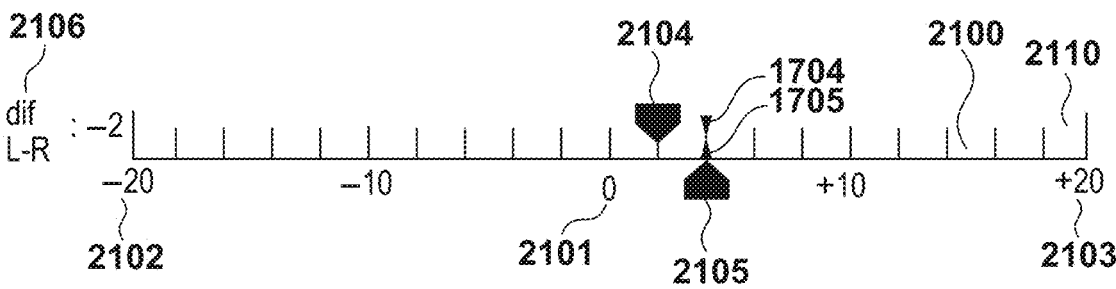

FIG. 22A
2201L    FIG. 22B    2201R

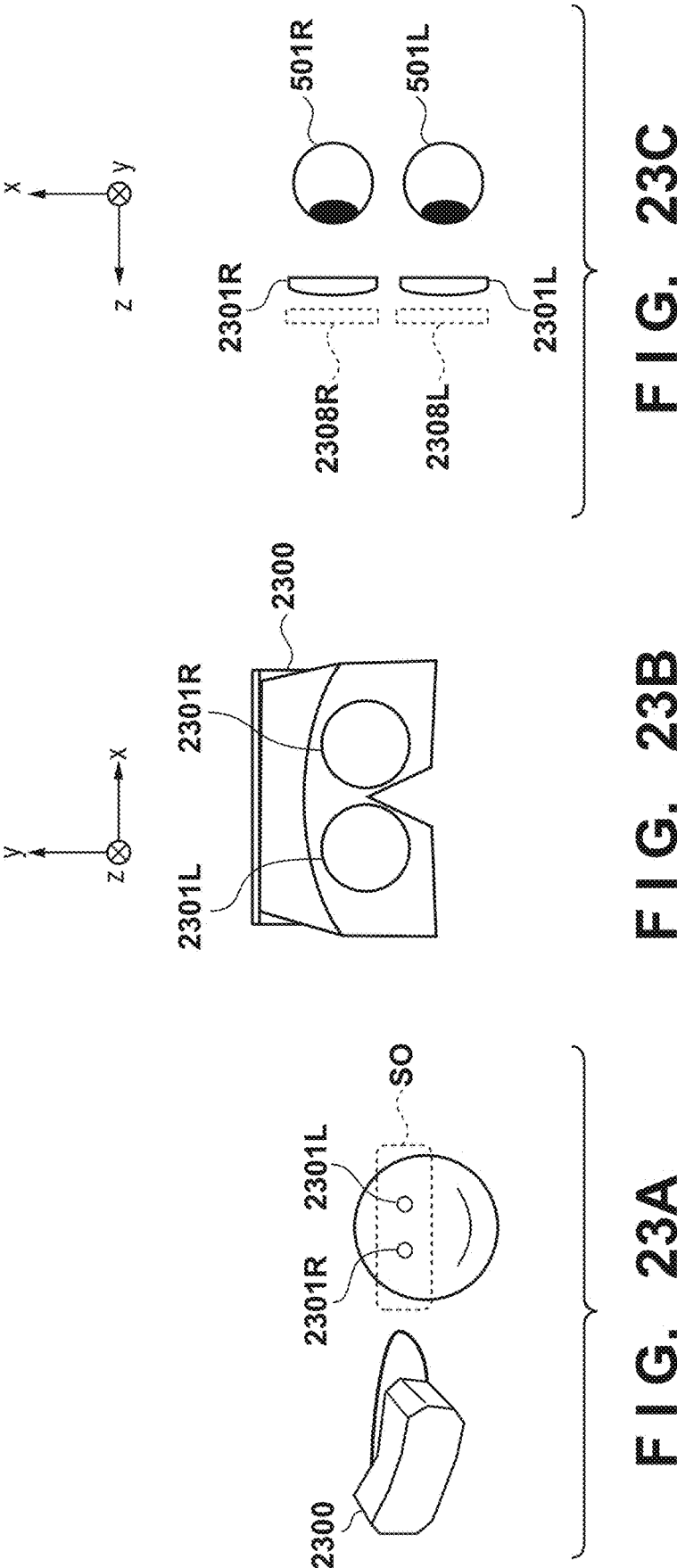
F I G. 23C
F I G. 23B
F I G. 23A

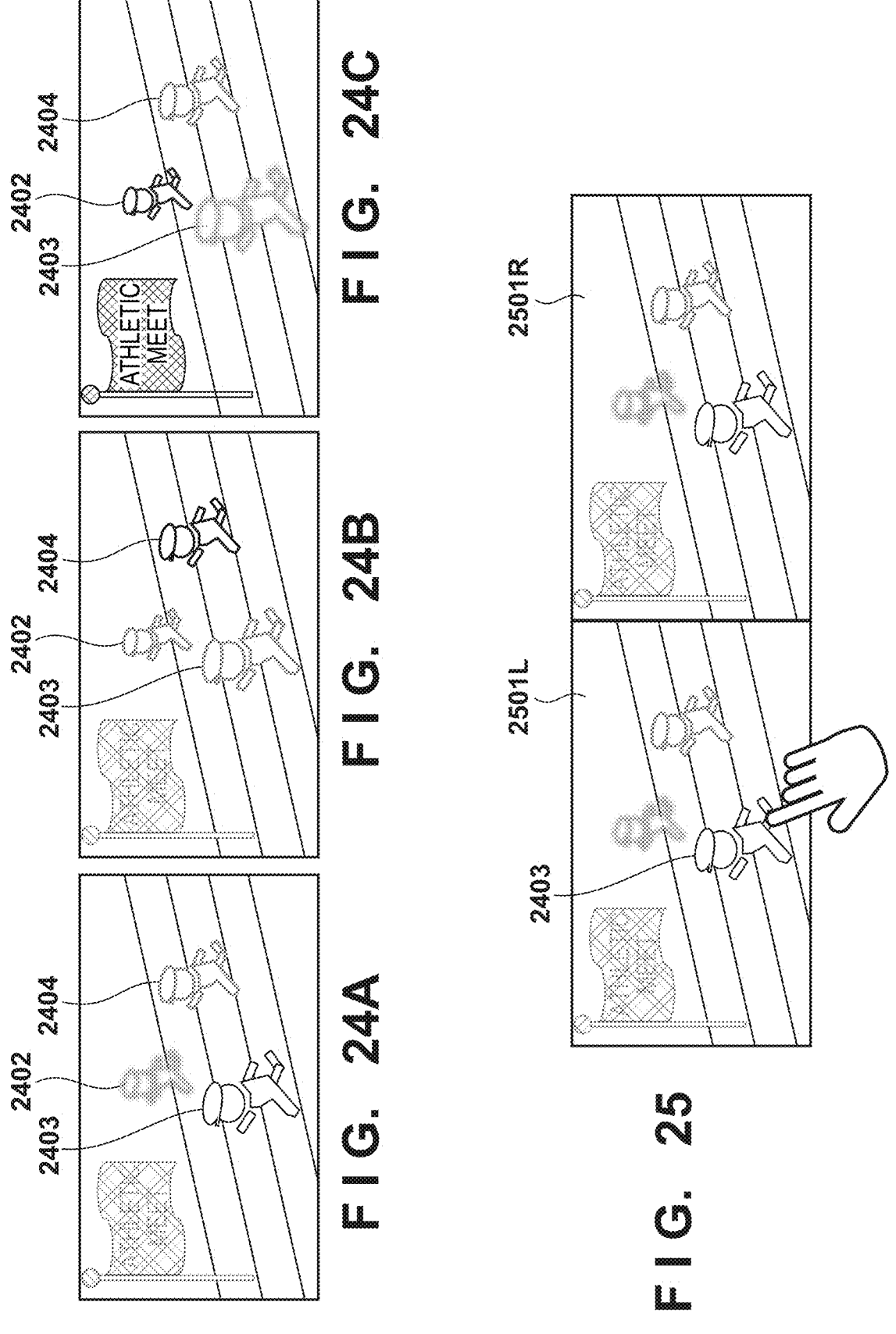
F I G. 24A
F I G. 24B
F I G. 24C
F I G. 25

F I G. 26
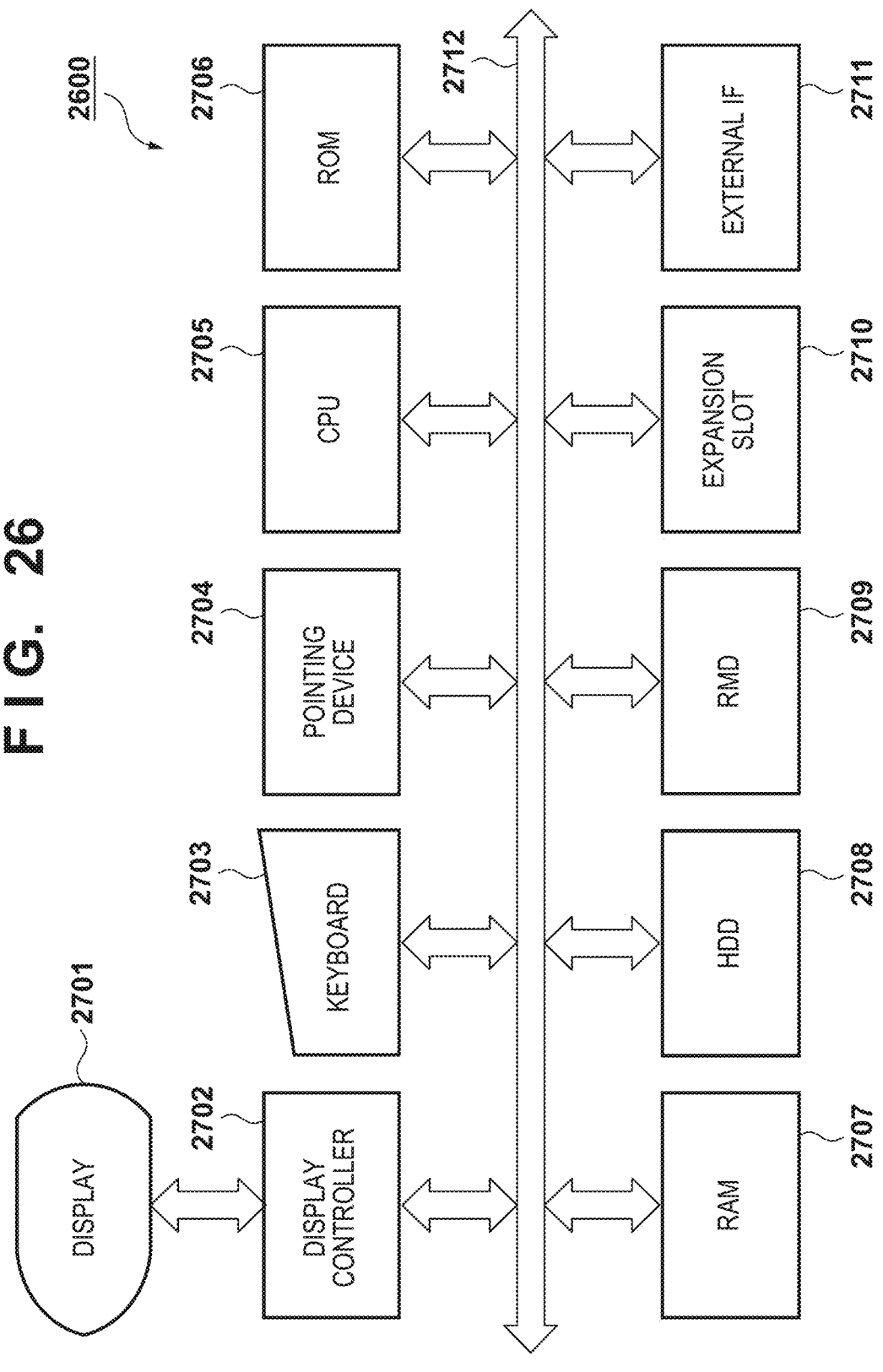

F I G. 27A
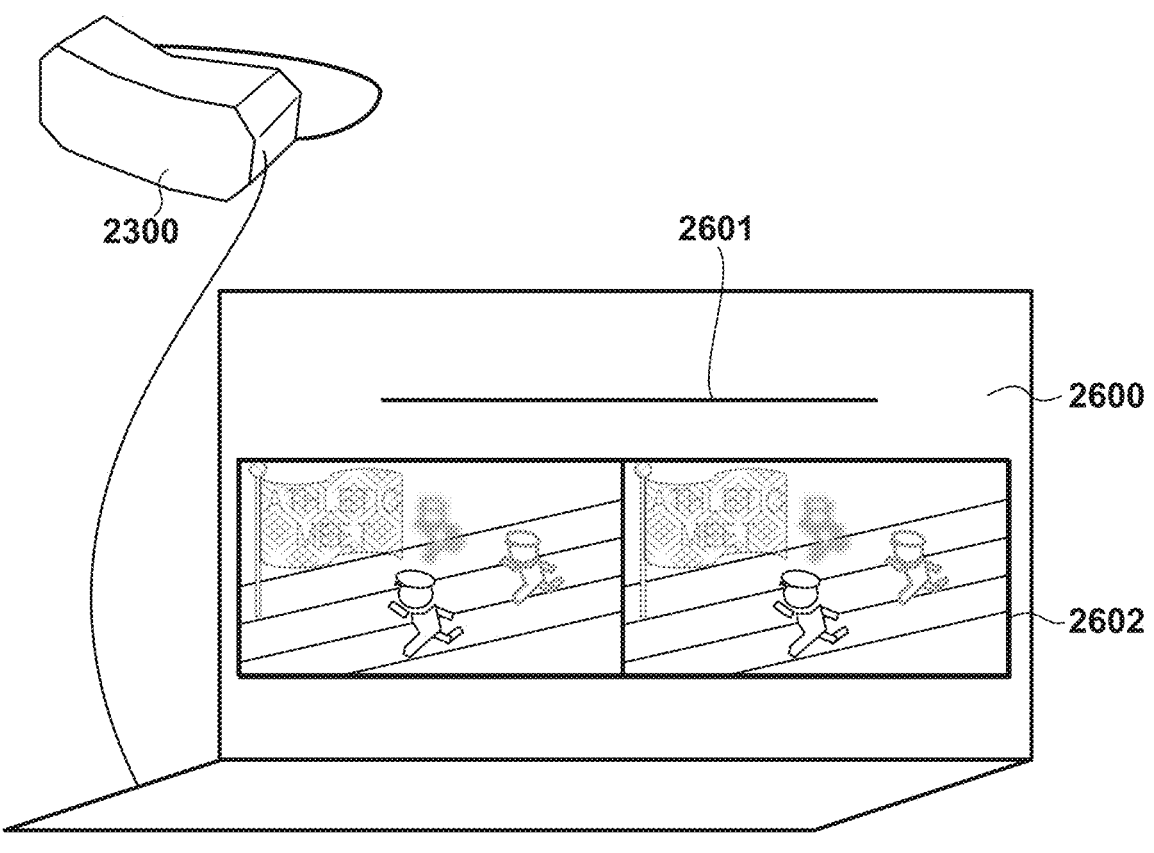

F I G. 27B
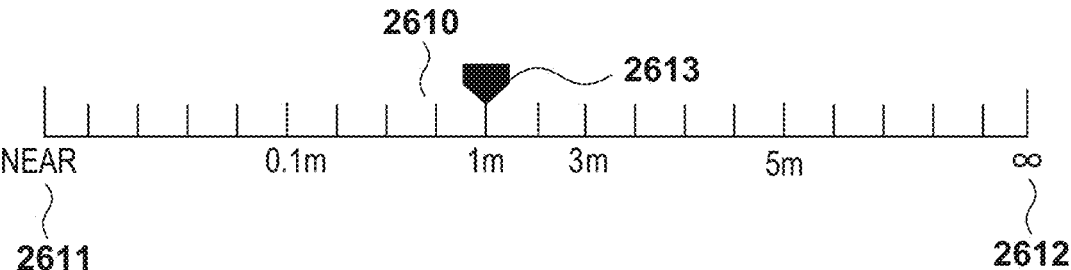
F I G. 27C
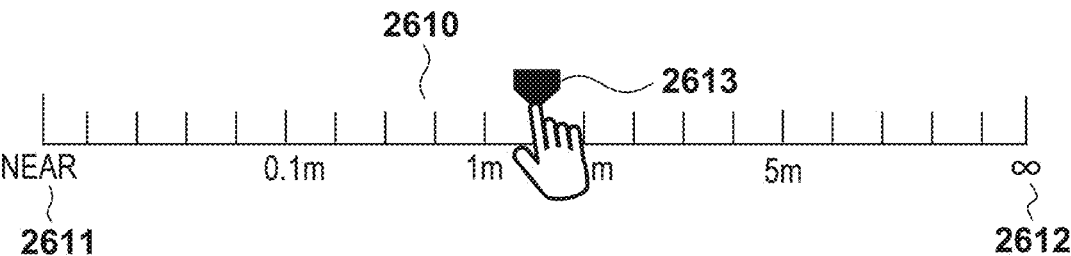
F I G. 27D
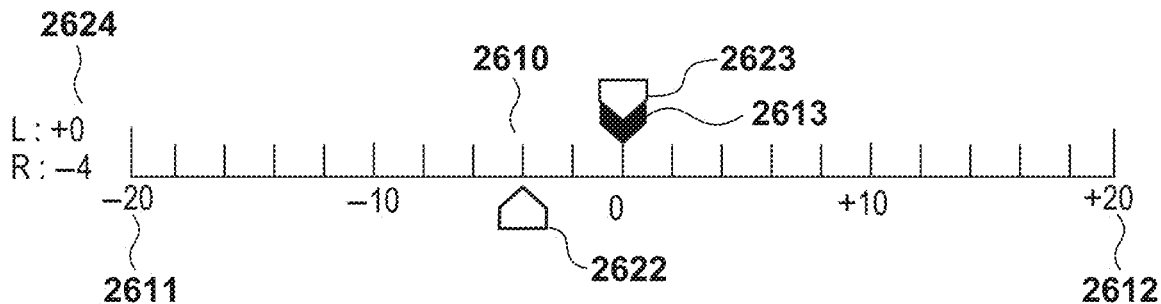

APPARATUS AND METHOD EXECUTED BY APPARATUS

CROSS-REFERENCE TO RELATED APPLICATION

This application is a Continuation of co-pending U.S. application Ser. No. 18/325,892 filed May 30, 2023, which is a Continuation of U.S. application Ser. No. 17/835,844, filed Jun. 8, 2022 and issued as U.S. Pat. No. 11,924,548 on Mar. 5, 2024, which claims priority from Japanese Patent Application No. 2021-098165, filed on Jun. 11, 2021, which is hereby incorporated by reference herein in its entireties.

BACKGROUND

Technical Field

The aspect of the embodiments relates to an apparatus and a method executed by the apparatus, and particularly relates to an apparatus capable of capturing an image using a lens unit having a plurality of optical axes and a method executed by such an apparatus.

Description of the Related Art

A stereoscopic camera including a plurality of imaging optical systems and capable of shooting stereo images with a single image sensor is known (Japanese Patent Laid-Open No. 2011-205558). Meanwhile, in recent years, due to the drop in cost of VR goggles and other factors, there is demand for easier methods for shooting stereoscopic images.

For example, it is conceivable to capture stereoscopic images using a typical interchangeable lens-type image capture apparatus by incorporating two imaging optical systems into a single lens barrel as an interchangeable lens unit.

However, the image plane phase detection method of focus detection currently used mainly in mirrorless cameras assumes that the lens unit has a single optical axis. Therefore, when a lens unit having a plurality of optical axes, such as a lens unit in which two imaging optical systems are incorporated into a single lens barrel, is mounted, the accuracy of focus detection can drop.

SUMMARY

According to an aspect of the embodiments, there is provided an apparatus comprising: a sensor capable of generating a signal pair used in focus detection; and at least one processor; and a memory coupled to the at least one processor, the memory having instructions that, when executed by the processor, performs operations as: an obtaining unit configured to obtain, based on a defocus amount obtained using the signal pair, a focus distance of a lens unit that is mounted to the apparatus; and an adjusting unit configured to adjust a focus distance of the lens unit based on the obtained focus distance, wherein when the lens unit is a multi-scopic lens unit having a plurality of optical systems having different axes, the obtaining unit obtains the focus distance using an adjustment value obtained based on an axis position that is a position on the sensor through which an axis of the multi-scopic lens unit passes.

According to an aspect of the embodiments, there is provided a method executed by an apparatus including a sensor capable of generating a signal pair used in focus detection, the method comprising: obtaining, based on a defocus amount obtained using the signal pair, a focus distance of a lens unit that is mounted to the apparatus; and adjusting a focus distance of the lens unit based on the obtained focus distance, wherein when the lens unit is a multi-scopic lens unit having a plurality of optical systems having different optical axes, the obtaining includes obtaining the focus distance using an adjustment value obtained based on an axis position that is a position on the sensor through which an axis of the multi-scopic lens unit passes.

According to an aspect of the embodiments, there is provided a non-transitory computer-readable medium storing a program executable by a computer included in an apparatus having a sensor capable of generating a signal pair used in focus detection, the program causes, when executed by the computer, to perform a method comprising: obtaining, based on a defocus amount obtained using the signal pair, a focus distance of a lens unit that is mounted to the apparatus; and adjusting a focus distance of the lens unit based on the obtained focus distance, wherein when the lens unit is a multi-scopic lens unit having a plurality of optical systems having different axes, the obtaining includes obtaining the focus distance using an adjustment value obtained based on an axis position that is a position on the sensor through which an axis of the multi-scopic lens unit passes.

Further features of the disclosure will become apparent from the following description of exemplary embodiments (with reference to the attached drawings).

BRIEF DESCRIPTION OF THE DRAWINGS

FIG. 5 is a diagram schematically illustrating a relationship between a defocus amount and an image shift amount based on a pair of focus detection signals.

FIG. 6 is a flowchart illustrating focus detection processing according to a first embodiment.

FIG. 7 is a schematic cross-sectional view of an optical system having an image sensor and a plurality of optical axes.

FIGS. 8A and 8B are diagrams illustrating examples of changes in an amount of light in a focus detection signal when an optical system having a plurality of optical axes is mounted.

FIG. 9 is a diagram illustrating an example of a live view image display according to a second embodiment.

FIGS. 10A to 10D are diagrams illustrating an example of a focus guide display format.

FIG. 11 is a flowchart pertaining to focus guide display processing.

FIG. 12 is a flowchart pertaining to live view display operations according to the second embodiment.

FIG. 14 is a flowchart pertaining to indicator display control processing according to the third embodiment.

FIG. 16 is a diagram illustrating an example of a live view image display according to the third embodiment.

FIGS. 17A to 17D are diagrams illustrating examples of display formats of indicators that present a difference in the degree of focus between left and right images according to a fourth embodiment.

FIG. 18 is a diagram illustrating an example of a live view image display according to the fourth embodiment.

FIG. 19 is a flowchart pertaining to shift adjustment processing according to a fifth embodiment.

FIGS. 20A and 20B are diagrams illustrating examples of the display format of the indicators in the fourth embodiment corresponding to a sixth embodiment.

FIGS. 21A to 21C are diagrams illustrating examples of the display format of a calibration guide according to the sixth embodiment.

FIGS. 22A and 22B are diagrams illustrating a calibration method according to the sixth embodiment.

FIGS. 23A to 23C are diagrams pertaining to XR goggles used in a seventh embodiment.

FIGS. 24A to 24C are diagrams illustrating an example of a recorded image according to the seventh embodiment.

FIG. 25 is a diagram illustrating an example of an operation to change an in-focus subject in a recorded image according to the seventh embodiment.

FIG. 26 is a block diagram illustrating an example of the configuration of a computer capable of implementing the seventh embodiment.

FIGS. 27A to 27D are diagrams illustrating a calibration method according to the seventh embodiment.

DESCRIPTION OF THE EMBODIMENTS

Note that the following embodiments will describe a case where the disclosure is applied in an interchangeable lens-type digital camera. However, the disclosure can also be applied in any electronic device that can have a camera including an image plane phase detection-type focus detection function. Such electronic devices include the following. These are image capture apparatuses in general (video cameras, surveillance cameras, and the like), computer devices (personal computers, tablets, media players, PDAs, and the like), communication devices (cellular phones, smartphones, IoT devices, and the like), game consoles, robots, drones, and dashboard cameras. These are merely examples, however, and the disclosure can be applied in other electronic devices as well.

First Embodiment

Overall Configuration

Figure 1A:
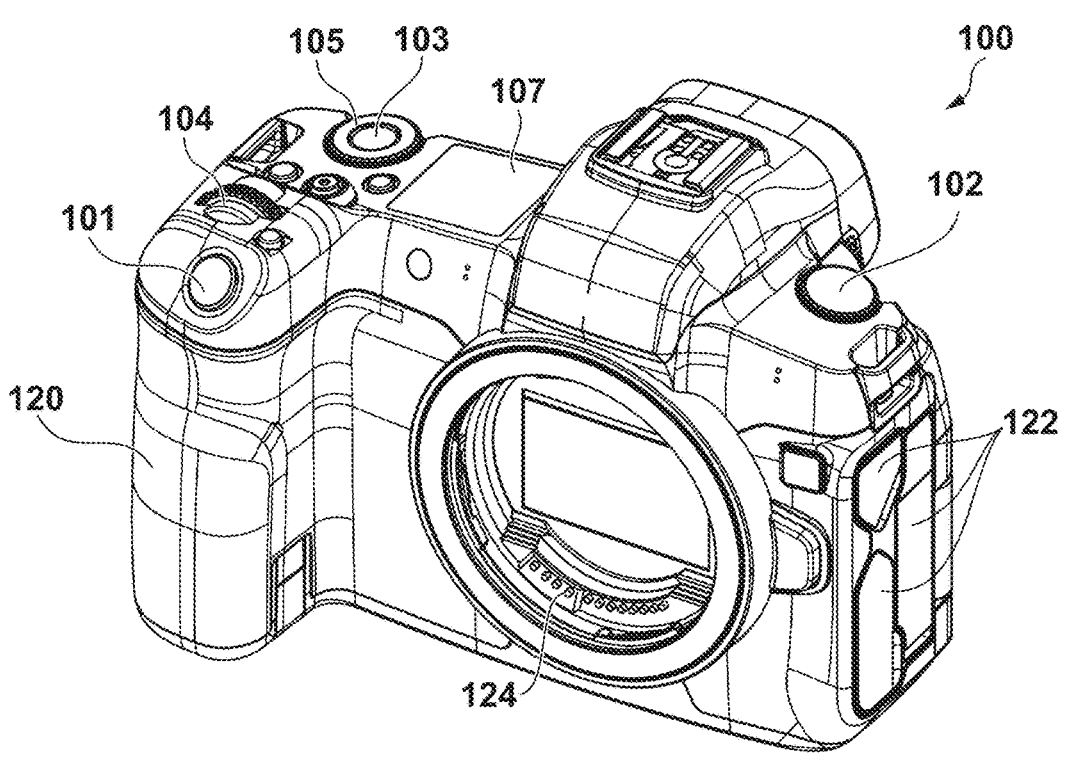
FIGS. 1A and 1B are perspective views illustrating an example of the external appearance of a camera 100 serving as an example of an image capture apparatus according to an embodiment.
Figure 1B:
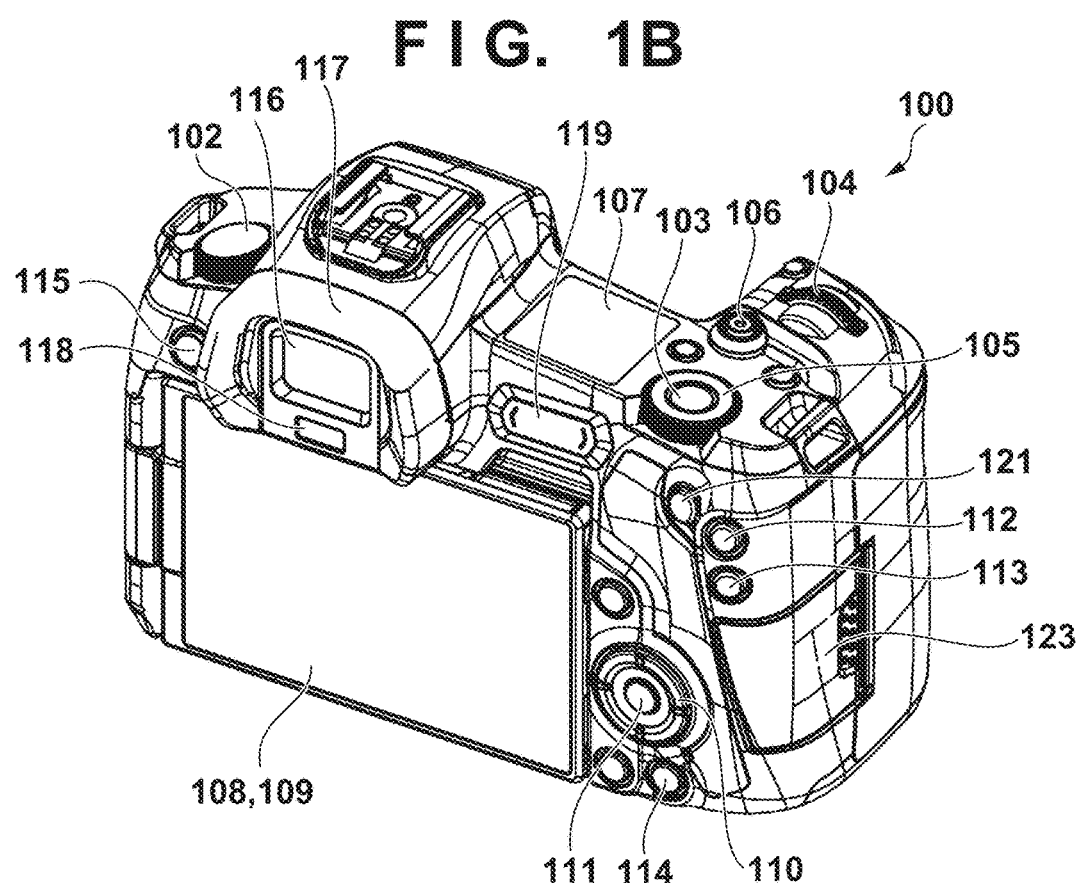

FIGS. 1A and 1B are perspective views illustrating an example of the external appearance of a body 100 of an interchangeable lens-type mirrorless digital camera (called a "camera 100" hereinafter) serving as an example of an image capture apparatus according to a first embodiment of the disclosure. FIG. 1A is a perspective view of the front of the camera 100 from above at an angle, and FIG. 1B is a perspective view of the rear of the camera 100 from above at an angle.

The camera 100 has, on its top surface, a shutter button 101, a power switch 102, a mode changing switch 103, a main electronic dial 104, a sub electronic dial 105, a moving image button 106, and a viewfinder external display unit 107. The shutter button 101 is an operation unit for performing shooting preparations or making a shooting instruction. The power switch 102 is an operation unit for switching the power of the camera 100 on and off. The mode changing switch 103 is an operation unit for switching among various types of modes. The main electronic dial 104 is a rotary operation unit for changing setting values such as shutter speed, aperture, and the like. The sub electronic dial 105 is a rotary operation unit for moving a selection frame (a cursor), moving through images, and the like. The moving image button 106 is an operation unit for instructing moving image shooting (recording) to start and stop. The viewfinder external display unit 107 displays various setting values such as shutter speed, aperture, and the like.

The camera 100 has, on its rear surface, a display unit 108, a touch panel 109, a directional key 110, a SET button 111, an AE lock button 112, an enlarge button 113, a playback button 114, a menu button 115, an eyepiece part 116, an eye proximity sensing unit 118, and a touch bar 119. The display unit 108 displays images, various types of information, and the like. The touch panel 109 is an operation unit that detects touch operations made on a display surface (a touch operation surface) of the display unit 108.

The directional key 110 is an operation unit constituted by a key which can be depressed in the up, down, left, and right directions (a four-direction key). Operations can be made according to the position of the directional key 110 which has been depressed. The SET button 111 is an operation unit pressed mainly when confirming a selected item. The AE lock button 112 is an operation unit pressed when locking the exposure state in a shooting standby state. The enlarge button 113 is an operation unit for switching an enlarged mode on and off during live view display (LV display) in a shooting mode. Operating the main electronic dial 104 while the enlarged mode is on enlarges or reduces the live view image (LV image). Additionally, the enlarge button 113 is used to enlarged playback images in a playback mode, increase an enlargement rate, and so on.

The playback button 114 is an operation unit for switching between a shooting mode and the playback mode. Pressing the playback button 114 during the shooting mode causes a transition to the playback mode, and the newest image among images recorded in a recording medium 228 (described later) can be displayed in the display unit 108. The menu button 115 is an operation unit pressed when displaying a menu screen, in which various types of settings can be made, in the display unit 108. A user can make various types of settings in the camera 100 by operating the menu screen displayed in the display unit 108 using the directional key 110 and the SET button 111. The menu screen can be operated using the touch panel 109 instead of using buttons or in conjunction with the use of buttons.

The eyepiece part 116 is a window for looking into an eyepiece viewfinder (a look through-type viewfinder) 117. The user can view an image displayed in an internal electronic viewfinder (EVF) 217 (described later) through the eyepiece part 116. The eye proximity sensing unit 118 is a sensor that senses whether an object is near the eyepiece part 116.

The touch bar 119 is a bar-shaped touch-based operation unit (line touch sensor) capable of accepting touch operations. The touch bar 119 is disposed in a position where the user can make a touch operation (can touch) with their right thumb while holding a grip part 120 with their right hand (with the pinky, ring, and middle fingers of their right hand) in a state where the shutter button 101 can be depressed by the index finger of their right hand. In other words, the touch bar 119 can be operated in a state where the shutter button 101 can be depressed at any time (a shooting attitude) while looking into the eyepiece viewfinder 117 through the eyepiece part 116. The touch bar 119 can accept a tap operation on the touch bar 119 (an operation of touching and releasing within a predetermined amount of time without moving the touched position), left and right slide operations (operations of touching and then moving the touched position while remaining in contact), and the like. The touch bar 119 is a different operation unit from the touch panel 109 and may have a display function. The touch bar 119 according to the present embodiment functions as a multi-function bar (an M-Fn bar).

The camera 100 also includes the grip part 120, a thumbrest part 121, a terminal cover 122, a lid 123, a communication terminal 124, and the like. The grip part 120 is a holding part formed in a shape which is easy for the user to grip with their right hand while holding the camera 100. The shutter button 101 and the main electronic dial 104 are disposed in positions which can be operated by the right index finger while the camera 100 is held by gripping the grip part 120 with the right pinky, ring, and middle fingers. The sub electronic dial 105 and the touch bar 119 are disposed in positions which can be operated by the right thumb in the same state.

The thumbrest part 121 (thumb standby position) is a grip part provided on the rear surface of the camera 100 at a location where it is easy to place the thumb of the right hand which is holding the grip part 120 while not operating any operation units. The thumbrest part 121 is constituted by a rubber member or the like to increase the holding power (the grip). The terminal cover 122 protects connectors such as connection cables that connect the camera 100 to external devices. The lid 123 protects the recording medium 228 (described later) and a slot for storing the recording medium 228 by covering the slot. The communication terminal 124 is a terminal for communication with a lens unit 200 (described later) which can be attached to and removed from the camera 100.

Internal Configuration of Camera 100

Figure 2:
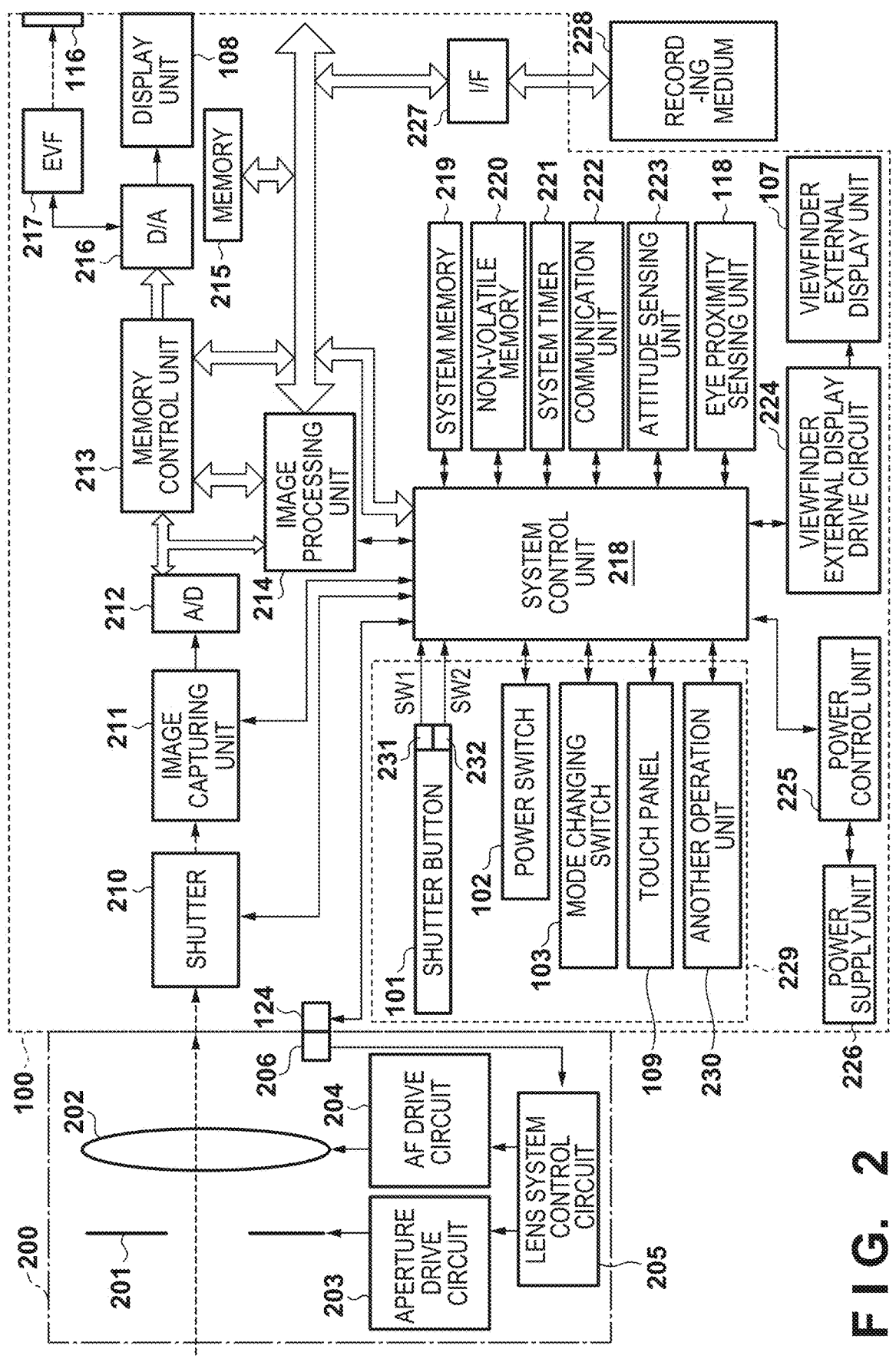
FIG. 2 is a block diagram illustrating an example of the functional configuration of a camera system.

FIG. 2 is a block diagram illustrating an example of the internal configuration (the functional configuration) of a camera system in which an interchangeable lens unit 200 is mounted to the camera 100. In FIG. 2, the same reference signs as in FIGS. 1A and 1B are given to the elements also illustrated in FIGS. 1A and 1B. Descriptions of elements already described with reference to FIGS. 1A and 1B will be omitted as appropriate.

The lens unit 200 will be described first.

The lens unit 200 is an example of an interchangeable lens that can be attached to and removed from the camera 100. The lens unit 200 is a general single-lens (a lens having a single optical axis). The lens unit 200 includes an aperture stop 201, a lens 202, an aperture drive circuit 203, an AF (autofocus) drive circuit 204, a lens system control circuit 205, a communication terminal 206, and the like.

The aperture stop 201 is configured such that the diameter of the opening can be adjusted. The lens 202 is constituted by a plurality of lenses. The aperture drive circuit 203 adjusts an amount of light by controlling the diameter of the opening in the aperture stop 201. The AF drive circuit 204 drives a focus lens included in the lens 202 and adjusts the distance at which the lens unit 200 focuses.

The lens system control circuit 205 includes a CPU, ROM, and RAM, for example, and controls operations of the various units of the lens unit 200 by loading a program which is stored in the ROM into the RAM and executing the program using the CPU. The lens unit 200 and the camera 100 are electrically connected through the communication terminals 206 and 124, and the lens system control circuit 205 and a system control unit 218 included in the camera 100 can therefore communicate with each other. The lens system control circuit 205 controls the aperture drive circuit 203, the AF drive circuit 204, and the like based on the instructions from the system control unit 218.

The configuration of the camera 100 will be described next.

The camera 100 includes a shutter 210, an image capturing unit 211, an A/D converter 212, a memory control unit 213, an image processing unit 214, memory 215, a D/A converter 216, the EVF 217, the display unit 108, and the system control unit 218.

The shutter 210 is a focal plane shutter that operates based on instructions from the system control unit 218 and controls the exposure time of the image capturing unit 211. The image capturing unit 211 is an image sensor constituted by a CCD, a CMOS element, or the like that converts an optical image into an electrical signal. In the present embodiment, the image capturing unit 211 is an image sensor that supports focus detection using the image plane phase detection method. Specifically, the image capturing unit 211 is capable of outputting a focus detection signal pair to implement focus detection using the phase detection method.

The A/D converter 212 converts analog signals output from the image capturing unit 211 into digital signals (image data). The image processing unit 214 carries out predetermined processing (pixel interpolation, resizing processing such as reduction, color conversion processing, and the like) on data input through the A/D converter 212 or the memory control unit 213. The image processing unit 214 performs predetermined computational processing using shot image data to calculate evaluation values and the like used for AF, AE, and the like. Based on the obtained computational results, the system control unit 218 performs exposure control, focus detection control, and the like. A defocus amount based on the focus detection signal pair obtained from the image capturing unit 211 is also calculated by the image processing unit 214 as one of the evaluation values. Furthermore, the image processing unit 214 performs predetermined computational processing using the shot image data, and performs auto white balance (AWB) processing on the image data based on the obtained computational results.

Image data from the A/D converter 212 is written into the memory 215 through the image processing unit 214 and the memory control unit 213. Alternatively, image data from the A/D converter 212 is written into the memory 215 through the memory control unit 213 without going through the image processing unit 214. The memory 215 stores the image data output by the A/D converter 212 and image data generated by the image processing unit 214. The image data generated by the image processing unit 214 includes display image data for display in the display unit 108, the EVF 217, or the like, and recording image data for recording into the recording medium 228. The memory 215 has a storage capacity sufficient to store a predetermined number of still image data, a predetermined time's worth of moving image data and audio data, and so on. A partial region of the memory 215 is used as video memory for the display unit 108.

The D/A converter 216 converts the image data, stored in the memory 215, into an analog signal suitable for display in the display unit 108, the EVF 217, and the like. The display image data written into the memory 215 is therefore displayed by the display unit 108, the EVF 217, or the like via the D/A converter 216. The display unit 108 and the EVF 217 perform displays according to the analog signal from the D/A converter 216. The display unit 108 and the EVF 217 are, for example, LCD, organic EL, or similar displays.

While shooting moving images with the image capturing unit 211, image data stored in the memory 215 through the A/D converter 212 is converted into an analog signal by the D/A converter 216, and is then sequentially transferred to the display unit 108, the EVF 217, or the like and displayed. This makes it possible to perform live view display in the display unit 108, the EVF 217, or the like.

The system control unit 218 is a control unit constituted by at least one processor (CPU) and/or at least one circuit. In other words, the system control unit 218 may be a processor (CPU), a circuit, or a combination of a processor and a circuit. For example, if the system control unit 218 has a processor (CPU), the system control unit 218 controls the camera 100 as a whole by loading a program stored in non-volatile memory 220 into system memory 219 and executing the program using the processor. The system control unit 218 also performs display control by controlling the memory 215, the D/A converter 216, the display unit 108, the EVF 217, and the like.

The camera 100 also includes the system memory 219, the non-volatile memory 220, a system timer 221, a communication unit 222, an attitude sensing unit 223, and the eye proximity sensing unit 118.

The system memory 219 is, for example, RAM. Operational constants and variables of the system control unit 218, programs read out from the non-volatile memory 220, and so on are loaded into the system memory 219.

The non-volatile memory 220 may be, for example, EEPROM that can be recorded to and erased electrically. Operational constants, programs, and the like of the system control unit 218 are recorded in the non-volatile memory 220.

The system timer 221 is a time measurement unit that measures times used in various types of control, measures the time of an internal clock, and so on. The communication unit 222 sends and receives image signals, audio signals, and the like to and from external devices connected wirelessly or over a hardwire cable. The communication unit 222 can also communicate with external devices compliant with wireless LAN (Local Area Network), with devices on the Internet, and so on. The communication unit 222 is also capable of communicating with external devices over Bluetooth (registered trademark). The communication unit 222 can transmit images shot by the image capturing unit 211 (including live images), images recorded in the recording medium 228, and the like, and can also receive image data and various other types of information from external devices.

The attitude sensing unit 223 outputs a signal expressing the attitude of the camera 100 relative to the direction of gravity. Whether an image shot by the image capturing unit 211 is an image shot while the camera 100 was held horizontally or vertically can be determined based on a signal output by the attitude sensing unit 223. The system control unit 218 can add orientation information based on the signal output by the attitude sensing unit 223 to the image file of an image shot by the image capturing unit 211, record the image in a rotated state, and so on. An accelerometer, a gyrosensor, or the like can be used as the attitude sensing unit 223, for example. Based on the output signal from the attitude sensing unit 223, the system control unit 218 can also sense movement of the camera 100 (pan, tilt, lifting, whether the camera is at rest, and the like).

The eye proximity sensing unit 118 can sense the approach of an object to the eyepiece part 116 of the eyepiece viewfinder 117 that incorporates the EVF 217. For example, an infrared proximity sensor can be used for the eye proximity sensing unit 118. When an object is nearby, infrared light emitted from a light-emitting unit (not illustrated) of the eye proximity sensing unit 118 is reflected by the object and received by a light-receiving unit of the infrared proximity sensor. Whether or not there is an object that has approached the eyepiece part 116 can be determined by the amount of infrared light received.

The system control unit 218 switches the display unit 108 and the EVF 217 between displaying (a display state)/not displaying (a non-display state) in accordance with whether a nearby object has been sensed by the eye proximity sensing unit 118. Specifically, when the camera is at least in the shooting standby state and a display destination switch setting is set to auto switching, the display of the display unit 108 is turned on and the display of the EVF 217 is turned off while no nearby object is detected. If a nearby object is detected, the display of the EVF 217 is turned on and the display of the display unit 108 is turned off. Note that the eye proximity sensing unit 118 is not limited to an infrared proximity sensor, and other sensors may be used as long as the sensors can sense a state that can be considered eye proximity.

The camera 100 also includes the viewfinder external display unit 107, a viewfinder external display drive circuit 224, a power control unit 225, a power supply unit 226, a recording medium I/F 227, an operation unit 229, and the like.

The viewfinder external display unit 107 displays various setting values of the camera 100, such as shutter speed, aperture, and the like, through the viewfinder external display drive circuit 224. The power control unit 225 is constituted by a battery detection circuit, a DC-DC converter, switch circuits for switching the blocks through which power passes, and so on, and detects whether or not a battery is connected, the type of the battery, the remaining battery power, and so on. The power control unit 225 also controls the DC-DC converter based on the detection results and instructions from the system control unit 218, and supplies a voltage for a period to the various units, including a recording medium 228. The power supply unit 226 is a primary battery such as an alkali battery, a lithium battery, or the like, a secondary battery such as a NiCd battery, a NiMH battery, a Li battery, or the like, an AC adapter, or the like. The recording medium I/F 227 is an interface for the recording medium 228, which is a memory card, a hard disk, or the like. The recording medium 228 is a memory card or the like for recording shot images, and is constituted by semiconductor memory, a magnetic disk, or the like. The recording medium 228 may be removable or built-in.

The operation unit 229 is an input unit that accepts operations from the user (user operations), and is used to input various types of instructions to the system control unit 218. The operation unit 229 includes the shutter button 101, the power switch 102, the mode changing switch 103, the touch panel 109, other operation members 230, and the like. The other operation members 230 include the main electronic dial 104, the sub electronic dial 105, the moving image button 106, the directional key 110, the SET button 111, the AE lock button 112, the enlarge button 113, the playback button 114, the menu button 115, the touch bar 119, and the like.

The shutter button 101 has a first shutter switch 231 and a second shutter switch 232. The first shutter switch 231 turns on when the shutter button 101 is manipulated halfway, or in other words, is half-pressed, and generates a first shutter switch signal SW1. The system control unit 218 interprets the first shutter switch signal SW1 as a shooting preparation instruction and starts shooting preparation processing. The shooting preparation processing includes AF processing, AE processing, AWB processing, and flash pre-emission processing.

The second shutter switch 232 turns on when the shutter button 101 is completely manipulated, or in other words, is fully pressed, and generates a second shutter switch signal SW2. The system control unit 218 interprets the second shutter switch signal SW2 as a still image shooting instruction and starts still image shooting operations based on exposure conditions determined in the AE processing. Each unit is then controlled to execute a series of shooting processing from reading signals from the image capturing unit 211 to generating an image file containing the still image data obtained from shooting and writing the image file into the recording medium 228.

The mode changing switch 103 switches the operating mode of the system control unit 218 among a still image shooting mode, a moving image shooting mode, the playback mode, and the like. The still image shooting mode includes an auto shooting mode, an auto scene determination mode, a manual mode, an aperture priority mode (Av mode), a shutter speed priority mode (Tv mode), and a program AE mode (P mode). There are also various types of scene modes, custom modes, and the like as shooting settings for different shooting scenes. The user can directly switch to any of the shooting modes mentioned above using the mode changing switch 103. Alternatively, the user can selectively switch to any of a plurality of modes displayed by using the operation unit 229 after first switching to a shooting mode list screen using the mode changing switch 103. Likewise, the moving image shooting mode may include a plurality of modes.

The touch panel 109 is a touch sensor that detects various types of touch operations on the display surface of the display unit 108 (an operation surface of the touch panel 109). The touch panel 109 and the display unit 108 can be configured as an integrated unit. For example, the touch panel 109 is attached to an upper layer of the display surface of the display unit 108. By associating input coordinates on the touch panel 109 with the display coordinates on the display surface of the display 108, a GUI can be configured to make it seem that the user can directly manipulate screens displayed in the display unit 108. "GUI" is an acronym of "Graphical User Interface". The touch panel 109 can use any of a variety of systems, including resistive film, electrostatic capacitance, surface acoustic wave, infrared, electromagnetic induction, image recognition, optical sensors, and the like. Depending on the type, a touch is sensed when contact is made with the touch panel 109, or a touch is sensed when a finger or pen has approached the touch panel 109, and either of these types may be used.

The system control unit 218 can detect the following operations or states on the touch panel 109.

A finger or pen that has not touched the touch panel 109 newly touching the touch panel 109, i.e., the start of a touch (called "touch-down" hereinafter).

A state in which a finger or pen is touching the touch panel 109 (called "touch-on" hereinafter).

A finger or pen moving while touching the touch panel 109 (called "touch-move" hereinafter).

A finger or pen that has been touching the touch panel 109 separating from the touch panel 109 (being released), i.e., the end of a touch (called "touch-up" hereinafter).

When nothing is touching the touch panel 109 (called "touch-off" hereinafter).

When a touch-down is detected, a touch-on is detected at the same time. A touch-on normally continues to be detected after a touch-down as long as no touch-up is detected. When a touch-move is detected, a touch-on is detected at the same time as well. Even if a touch-on is detected, a touch-move is not detected as long as the touched position does not move. A touch-off occurs after a touch-up has been detected for all fingers or pens that had been touching.

These operations/states, positional coordinates on the touch panel 109 where the finger or pen had been touching, and so on are communicated to the system control unit 218. The system control unit 218 determines what type of operation (touch operation) has been made on the touch panel 109 based on the communicated information. With respect to a touch-move, the movement direction of the finger or pen moving on the touch panel 109 can be determined based on changes in the positional coordinates, for each of a vertical component and a horizontal component on the touch panel 109. A slide operation is determined to have been performed if a touch-move of greater than or equal to a predetermined distance has been detected. If, while touching the touch panel 109, the finger or pen is quickly moved a given distance and then removed, the operation is called "flicking". In other words, a "flick" is an operation of quickly flicking a finger on the touch panel 109. A flick is determined to have been performed if a touch-move of greater than or equal to a predetermined distance and at greater than or equal to a predetermined speed is detected and a touch-up is then detected (it can be determined that a flick occurred continuing from a slide operation). Furthermore, when a plurality of locations (two points, for example) are touched at the same time, and the touched positions are brought together, the touch operation is called a "pinch-in", whereas when the touched positions are moved apart, the touch operation is called a "pinch-out". Pinch-out and pinch-in are collectively referred to as pinch operations (or simply "pinching").

Configuration of Multi-Scopic Lens Unit

Figure 3:
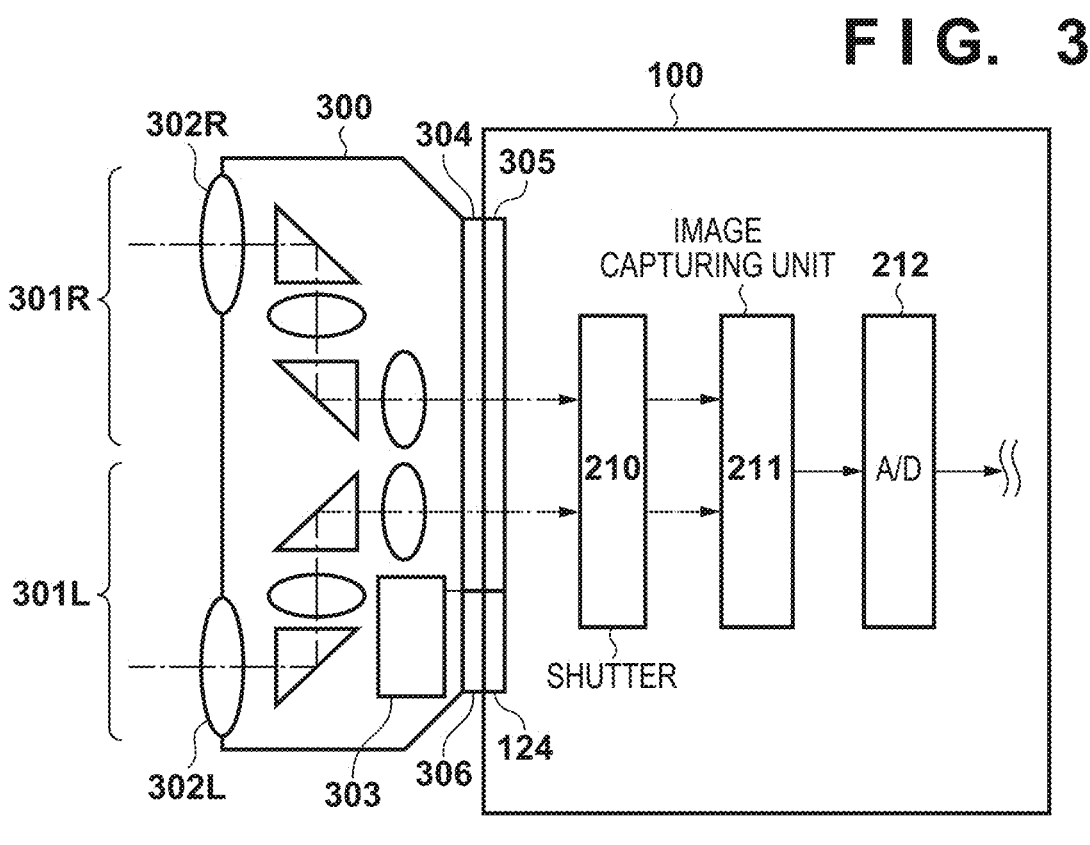
FIG. 3 is a block diagram illustrating another example of the functional configuration of the camera system.

FIG. 3 is a schematic diagram illustrating an example of the configuration of a binocular lens unit 300 as an example of a multi-scopic lens unit. In the present specification, "multi-scopic lens" refers to a lens unit constituted by a plurality of imaging optical systems within a single lens mount (or lens barrel), and which has a plurality of optical axes. FIG. 3 illustrates the binocular lens unit 300 mounted to the camera 100. In FIG. 3, only part of the configuration of the camera 100 illustrated in FIG. 2 is illustrated.

The binocular lens unit 300 is a type of interchangeable lens that can be attached to and removed from the camera 100. The binocular lens unit 300 has two imaging optical systems 301L and 301R in one lens barrel, and thus has two optical axes.

Here, it is assumed that the two imaging optical systems 301L and 301R are arranged so that the two optical axes are aligned in a horizontal line when the binocular lens unit 300 is mounted on the camera 100. The two imaging optical systems 301L and 301R have a substantially 180-degree viewing angle and can capture an area of the front hemisphere. Specifically, the two imaging optical systems 301L and 301R can shoot a visual field of 180 degrees in a left-right direction (horizontal angle, azimuth angle, yaw angle) and 180 degrees in the up-down direction (vertical angle, elevation angle, pitch angle), respectively. The two imaging optical systems 301L and 301R form a pair of parallax images having left and right parallax on the image plane of the image capturing unit 211. In the following descriptions, the imaging optical system 301L will be called a left eye optical system 301L, and the imaging optical system 301R will be called a right eye optical system 301R.

The right eye optical system 301R and the left eye optical system 301L each has a plurality of lenses, reflective mirrors, and the like. The plurality of lenses include at least a focus lens for adjusting the focus distance. The binocular lens unit 300 also has a lens system control circuit 303. The right eye optical system 301R is an example of a first optical system and the left eye optical system 301L is an example of a second optical system. In the right eye optical system 301R and the left eye optical system 301L, respective lenses 302R and 302L located on the subject side face in the same direction, and the optical axes thereof are substantially parallel.

Although not illustrated in FIG. 3, the binocular lens unit 300 has a configuration similar to the AF drive circuit 204. In this case, an AF drive circuit that drives the focus lenses of the right eye optical system 301R and the left eye optical system 301L in tandem, and at least one AF drive circuit that drives the focus lens of at least one of the right eye optical system 301R and the left eye optical system 301L independently, can be provided. The focus lens is driven by the lens system control circuit 303 based on the control of the system control unit 218 (adjusting unit).

The binocular lens unit 300 further includes an encoder that detects a rotation amount and a rotation direction of a focus ring provided on the lens barrel. The lens system control circuit 303 controls the AF drive circuit according to focus lens operations detected by the encoder, and provides what is known as a "by wire" manual focus function. In this case, the binocular lens unit 300 may have a switch that enables the user to switch the focus lens driven by the focus ring operations.

The binocular lens unit 300 is a VR180 lens for shooting images in the VR180 format, which is a format of VR images that enables binocular stereoscopic viewing, using the camera 100. In the VR180 lens, the right eye optical system 301R and the left eye optical system 301L each has a fisheye lens having a substantially 180-degree viewing angle. The right eye optical system 301R and the left eye optical system 301L are be able to obtain images that enable binocular VR display as VR180, and the viewing angle may be as low as 160 degrees. The VR180 lens can form a right image (a first image) using the right eye optical system 301R and a left image (a second image) using the left eye optical system 301L on the same image plane. It is assumed that the image capturing unit 211 of the camera 100 has one image sensor and that the binocular lens unit 300 forms the right image and the left image on the image plane of the one image sensor. However, the camera 100 may have two image sensors arranged in parallel, and the binocular lens unit 300 may form the right image on the image plane of one image sensor and the left image on the image plane of the other image sensor.

The binocular lens unit 300 includes a focus ring for adjusting the focus of the right eye optical system 301R and a focus ring for adjusting the focus of the left eye optical system 301L. Alternatively, a focus ring that simultaneously adjusts the focus of the right eye optical system 301R and the left eye optical system 301L, and a focus ring that adjusts the focus of one of the right eye optical system 301R and the left eye optical system 301L, are provided. By manipulating these focus rings, the user can manually adjust the focus distances of the right eye optical system 301R and the left eye optical system 301L. These focus rings may be provided individually or, in the case of a by-wire system, by switching the function of a single focus ring.

The binocular lens unit 300, like the (single-lens) lens unit 200, is attached to the camera 100 via a mount unit. The mount unit is constituted by a lens mount unit 304 and a camera mount unit 305. When the binocular lens unit 300 is mounted to the camera 100, the communication terminal 124 of the camera 100 is electrically connected to a communication terminal 306 of the binocular lens unit 300. This enables the system control unit 218 of the camera 100 and the lens system control circuit 303 of the binocular lens unit 300 to communicate with each other.

In the present embodiment, the right image and the left image are separated in the left-right direction and formed on the image plane of the image capturing unit 211. In other words, two optical images formed by the right eye optical system 301R and the left eye optical system 301L are formed on a single image sensor. The image capturing unit 211 converts the formed subject image (an optical signal) into an analog electrical signal. In this manner, by mounting the binocular lens unit 300, a parallax image pair (the right image and the left image) formed by the right eye optical system 301R and left eye optical system 301L can be obtained in a single shot. Additionally, by displaying the obtained right image and left image in VR as a right eye image and a left eye image, the user can view a three-dimensional VR image over a substantially 180-degree range, which is what is known as a "VR180 image".

Here, a "VR image" is an image that can be displayed in VR (described later). VR images include omnidirectional images (fulldome spherical images) shot by an omnidirectional camera (fulldome spherical camera), panoramic images that have a wider image range (effective image range) than the display range which can be displayed by a display unit at one time, and the like. VR images may be either still images or moving images. A moving image may be a pre-recorded moving image or a live image (an image obtained from a camera in near real-time).

A VR image has an image range (effective image range) equivalent to a visual field of up to 360 degrees in the left-right direction and 360 degrees in the up-down direction. VR images also include images that have a wider angle of view than can be shot a normal camera or a wider display range than can be displayed by a display unit at one time, even if the angle is less than 360 degrees in the left-right direction or 360 degrees in the up-down direction. The image shot by the camera 100 using the binocular lens unit 300 described above is a type of VR image. VR images can be displayed in VR, for example, by setting the display mode of a display device (a display device capable of displaying VR images) to "VR view". By displaying VR images with a 360-degree angle of view in VR, the user can view omnidirectional images which are seamless in the left-right direction by changing the attitude of the display device in the left-right direction (a horizontal rotation direction).

Here, "VR display" ("VR view") is a display mode that displays an image of a predetermined range of the visual field shot in the VR image according to the attitude of the display device. VR display includes "monocular VR display" ("monocular VR view"), in which a single image is displayed by applying a deformation that maps the VR image onto a virtual sphere (deformation in which distortion correction is applied). VR display also includes "binocular VR display" ("binocular VR view"), in which a left eye VR image and a right eye VR image are displayed side by side in left and right regions by performing a transformation that maps those images onto a virtual sphere, respectively.

It is possible to view stereoscopic images by performing a "binocular VR display" using the left eye VR image and the right eye VR image, which have parallax with respect to each other. In any VR display, for example, when a user wears a display device such as a head-mounted display (HMD), the image is displayed in a visual field range corresponding to the direction in which the user's face is facing. For example, assume that at a given point in time, a VR image displays a visual field range centered at 0 degrees in the left-right direction (a specific heading, e.g., north) and 90 degrees in the up-down direction (90 degrees from the zenith, i.e., horizontal). If the attitude of the display device is flipped front-to-back from this state (e.g., the display surface is changed from facing south to facing north), the display range is changed to an image of a visual field range centered at 180 degrees in the left-right direction (the opposite heading, e.g., south) and 90 degrees in the up-down direction, of the same VR image. In other words, when the user turns their face from north to south (i.e., turns around) while wearing the HMD, the image displayed in the HMD is also changed from an image of the north to an image of the south.

Note that the VR image shot using the binocular lens unit 300 of the present embodiment is a VR180 format image of a range of substantially 180 degrees in the front, and there is no image of a range of substantially 180 degrees in the rear. If such a VR180 format image is displayed in VR and the attitude of the display device is changed to a side where the image is not present, a blank region, for example, is displayed.

By displaying VR images in this way, the user has a sense of actually being in the VR image (in a VR space). Note that the VR image display method is not limited to a method of changing the attitude of the display device. For example, the display range may be moved (scrolled) in response to a user operation made using the touch panel, a directional button, or the like. In addition to changing the display range by changing the attitude, the display range may be changed in response to a touch-move made on the touch panel, dragging operations using a mouse or the like, pressing a directional button, or the like during VR display (in the "VR view" display mode). Note that a configuration in which a display device such as a smartphone is attached to VR goggles (a head-mounted adapter) is a type of HMD.

Configuration of Image Capturing Unit 211 (Image Sensor)

Figure 4:
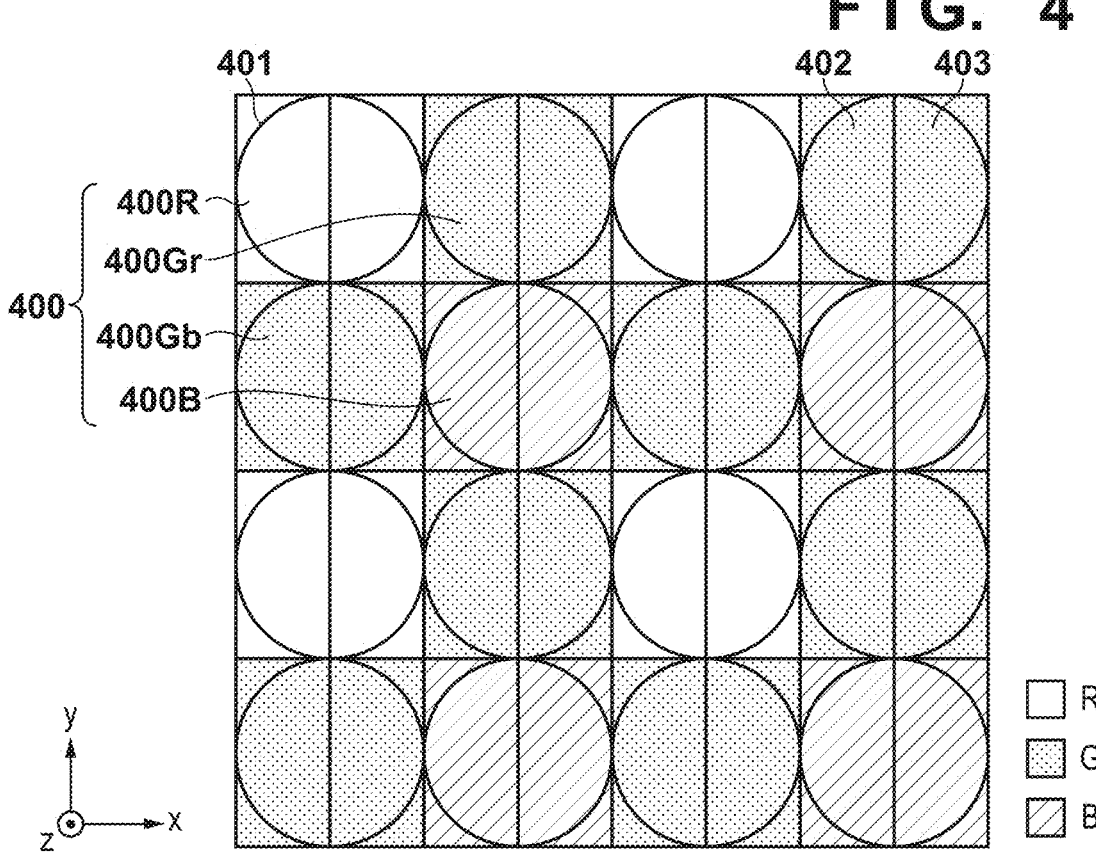
FIG. 4 is a diagram illustrating an example of a pixel array of an image sensor of the camera 100.

FIG. 4 is a diagram schematically illustrating an example of the pixel array in the image capturing unit 211 (image sensor) according to the present embodiment. The image sensor that constitutes the image capturing unit 211 in the present embodiment is capable of generating a signal pair used for focus detection through the phase detection method. FIG. 4 illustrates a pixel array of the image sensor (a two-dimensional CMOS sensor) in a range of four columns by four rows of image capturing pixels (a focus detection pixel array in a range of eight columns by four rows). Hereinafter, the term "pixel" alone refers to an image capturing pixel.

The image capturing unit 211 is provided with a primary-color Bayer array color filter. A pixel group 400 represents two rows by two columns of pixels, which is the unit by which the color filter repeats. The pixel group 400 includes a pixel 400R having R (red) spectral sensitivity, pixels 400Gr and 400Gb having G (green) spectral sensitivity, and a pixel 400B having B (blue) spectral sensitivity. One microlens 401 is provided for each pixel.

To enable the image capturing unit 211 to perform focus detection using the image plane phase detection method, each of the plurality of pixels arranged two-dimensionally in the image capturing unit 211 has two photodiodes (photoelectric conversion units) 402 and 403, which share a microlens 401. The first photodiode 402 and the second photodiode 403 each functions as a sub-pixel or a focus detection pixel. In other words, one pixel functions as two focus detection pixels. By treating the first photodiode 402 and the second photodiode 403 together as a single photodiode, one pixel functions as a single image capturing pixel. Hereinafter, a signal obtained by the first photodiode 402 will be called an "A signal", a signal obtained by the second photodiode 403 will be called a "B signal", and a signal obtained by adding the A signal and the B signal obtained by the same pixel will be called an "A+B signal". The A signal and the B signal will be called focus detection signals, and the A+B signal will be called a captured image signal. The A signal (or the B signal) may also be obtained by subtracting the B signal (or the A signal) from the A+B signal.

Although in the present embodiment, each pixel is constituted by two photodiodes that share the microlens 401, the number of photodiodes in each pixel may be three or more. A configuration may also be employed in which a dedicated focus detection pixel that can output substantially only the A signal or the B signal is provided. There are no restrictions on the configuration of the pixels provided in the image sensor as long as the sensor is capable of outputting signals that can realize focus detection through the phase detection method. Additionally, in the present embodiment, all the pixels have a plurality of photodiodes, but the configuration may be such that only some pixels have a plurality of photodiodes.

Relationship between Defocus Amount and Image Shift Amount

The relationship between a defocus amount and an image shift amount obtained from the A signal and the B signal that can be obtained by the image sensor illustrated in FIG. 4 will be described with reference to FIG. 5. Note that the defocus amount is calculated using a pair of image signals constituted by an A image signal, obtained by concatenating a plurality of A signals, and a B image signal, obtained by concatenating a plurality of B signals. The A image signal and the B image signal will also be called focus detection signals. Here, it is assumed that an image capture center (the center of a pixel region used for capturing images in the image sensor) and an optical axis center coincide.

Figure 5:
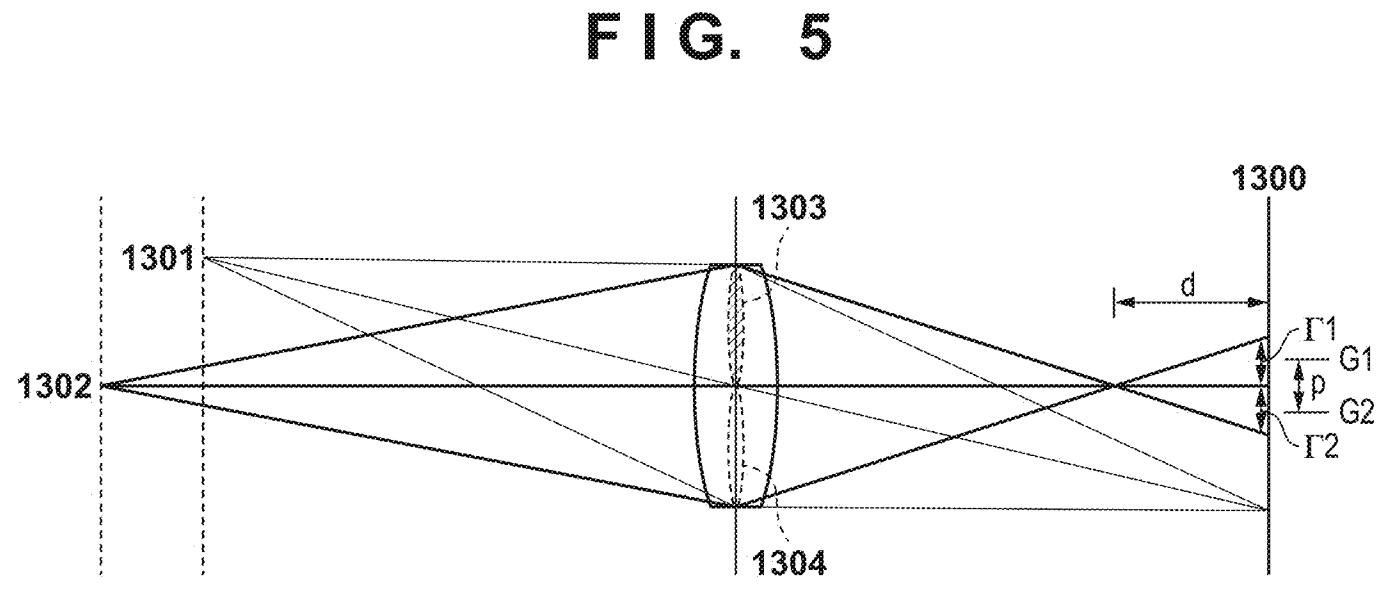

FIG. 5 schematically illustrates the relationship between a defocus amount d and an image shift amount between the pair of focus detection signals (the A image signal and the B image signal). 1300 indicates the image plane of the image sensor. The first photodiode 402 and the second photodiode 403, which share one microlens, divide the exit pupil of the imaging optical system into two parts, namely a first partial pupil region 1303 and a second partial pupil region 1304.

For the defocus amount d, a magnitude |d| thereof represents the distance from an image formation position of the subject image to the image plane 1300. Orientation is defined as a negative sign (d<0) in a front focus state, where the image formation position of the subject image is further on the subject side than the image plane 1300, and as a positive sign (d>0) in a back focus state, which is the opposite. In an in-focus state, where the image formation position of the subject image is at the image plane 1300 (i.e., an in-focus position), d=0. For example, an image of a subject 1301 is formed at the in-focus position (d=0), and is therefore in the in-focus state. On the other hand, the image formation position of a subject 1302 is further on the subject side than the image plane 1300 (d<0), and is therefore in a front focus state. In the following, the front focus state (d<0) and the back focus state (d>0) will be collectively referred to as a defocus state (|d|>0).

In the front focus state (d<0), of the light flux received from the subject 1302, the light flux that passes through the first partial pupil region 1303 (or the second partial pupil region 1304) spreads out to a width Γ1 (or Γ2) around a center of gravity position G1 (or G2) of the light flux after focusing. In this case, the image of the subject 1302 on the image plane 1300 is blurred. The blurred image is received by the first photodiode 402 (or the second photodiode 403) in each pixel arranged in the image sensor, and the A signal (or the B signal) is generated.

Accordingly, the pair of focus detection signals (the A image signal and the B image signal) are stored in memory as image data of a subject image having a width Γ1 (or Γ2) at the center of gravity position G1 (or G2) on the image plane 1300 (i.e., a blurred image). The width Γ1 (or Γ2) of the subject image increases roughly proportionally with an increase in the magnitude |d| of the defocus amount d. Likewise, assuming the amount of shift between the first focus detection signal and the second focus detection signal is "p", a magnitude |p| of the amount of shift increases with the magnitude |d| of the defocus amount d.

For example, as illustrated in FIG. 5, the image shift amount p can be defined as a difference between the center of gravity positions of the light fluxes, i.e., G1−G2, and the magnitude |p| thereof increases roughly proportionally with the magnitude |d| of the defocus amount. Note that in the back focus state (d>0), the direction of image shift between the pair of focus detection signals (the A image signal and the B image signal) is opposite from that in the front focus state, but the magnitude |p| of the image shift amount is proportional to the magnitude |d| of the defocus amount.

Therefore, phase detection AF can be realized by detecting the image shift amount p between the pair of focus detection signals (the A image signal and the B image signal) and converting the image shift amount p into a defocus amount using a conversion coefficient K. The image shift amount p between the pair of focus detection signals (the A image signal and the B image signal) can be obtained by shifting the A image signal and the B image signal relative to each other and calculating a correlation amount, and obtaining a shift amount that provides good correlation (a degree to which the signals match). The conversion coefficient K has a value that depends on the incident angle of the imaging optical system, the F value, and the optical axis position. Therefore, a conversion coefficient K based on the lens unit is used.

The conversion coefficient K is stored, for example, in non-volatile memory of the lens system control circuit 205 of the lens unit, and the system control unit 218 can obtain the conversion coefficient K from the attached lens unit. Of course, the conversion coefficient K may be obtained by other methods, such as storing the conversion coefficient K in association with lens unit identification information in the non-volatile memory 220 and obtaining the conversion coefficient K from the non-volatile memory 220 based on the identification information of the mounted lens unit.

The pair of focus detection signals is usually generated based on the signals of pixels in a focus detection region. Therefore, when a focus detection region is set for each imaging optical system, the defocus amount is calculated for each individual focus detection region. If the focus lenses of the imaging optical systems can be driven individually, the focus distance can be adjusted for each imaging optical system. One defocus amount based on the defocus amount calculated for each focus detection region may be used to adjust the focus distance of a plurality of imaging optical systems. The one defocus amount may be, for example, an average value, a representative value, or the like.

Defocus Amount Calculation Processing

The defocus amount calculation processing will be described with reference to the flowchart in FIG. 6.

The image processing unit 214 in the present embodiment generates the first focus detection signal (the A image signal) by concatenating the A signals obtained by the first photodiode 402 of a plurality of pixels in the image sensor. The second focus detection signal (the B image signal) is generated by concatenating the B signals obtained by the second photodiode 403 of the plurality of pixels used to generate the A image signal.

In step S1401, the image processing unit 214 (calculating unit) obtains the A signal and the B signal from each of the plurality of pixels included in a region of the image sensor corresponding to the focus detection region. As described above, the A signal (or the B signal) may also be obtained by subtracting the B signal (or the A signal) from the A+B signal.

In step S1402, the image processing unit 214 adds the A signals of the same color pixels, at equivalent positions in the horizontal direction (the row direction), in the vertical direction (the column direction) in order to suppress the data amount of the A image signal and the B image signal. This compresses the signal into two rows. Furthermore, the image processing unit 214 generates a luminance signal Y by adding the green (Gr), red (R), blue (B), and green (Gb) signals for the A signals added in the column direction. The plurality of luminance signals Y aligned in the row direction correspond to the A image signal. The image processing unit 214 applies similar addition processing to the B signals to generate the B image signal. By adding the signals, the Nyquist frequency in the addition direction becomes 1/n of the non-additive frequency. n is the number of added pixels.

In step S1403, the image processing unit 214 applies shading correction processing (optical correction processing) to the A image signal and the B image signal to correct or suppress a difference between the signal strengths. A shading correction value has a value that depends on the incident angle of the imaging optical system, the F value, and the optical axis position. Like the conversion coefficient K, the shading correction value can be obtained from the lens unit, the non-volatile memory 220, or the like.

In step S1404, the image processing unit 214 applies spatial band pass filter processing having a specific pass frequency band to the A image signal and the B image signal in order to improve the correlation between the A image signal and the B image signal (the degree to which the signals match) and improve the focus detection accuracy. Examples of band pass filters include differential filters, such as {1, 4, 4, 4, 0, −4, −4, −4, −1}, that cut DC components and extract edges, and additive filters such as {1, 2, 1} that suppress high-frequency noise components.

In step S1405, the image processing unit 214 calculates the correlation amount between the A image signal and the B image signal after applying the filter processing. The correlation amount is calculated for each shift amount while changing the relative shift amount of the A image signal and the B image signal in a pupil division direction.

The number of signals constituting the A image signal and the B image signal after the band pass filter processing is W (>2), and the kth ($1 \leq k \leq W$) signals are A(k) and B(k). If the shift amount is s and the range of the shift amount s is Γ, a correlation amount COR is calculated through Formula (1).

$$\mathrm{COR}(s) = \Sigma(k \in W)|A(k) - B(k-s)|, \, s \in \Gamma \qquad (1)$$

The absolute value of the difference between the kth A image signal A(k) and the k–sth B image signal B(k–s) is accumulated for k in the range of the number of signals W, and the correlation amount COR(s) for the shift amount s is calculated. The amount of shift is, for example, one pixel unit. If there are a plurality of A image signals and B image signals in the vertical direction, the correlation amounts calculated for each pair of the A image signal and the B image signal for the same shift amount may be added.

In step S1406, the image processing unit 214 calculates the shift amount in a unit of less than one pixel for which the correlation amount is a minimum value, based on the correlation amount COR(s) calculated for the shift amount in the unit of one pixel. The image processing unit 214 then takes the calculated shift amount as the image shift amount p between the A image signal and the B image signal. Furthermore, the image processing unit 214 applies (e.g., multiplies) the conversion coefficient K described above to the image shift amount p to convert the image shift amount p to the defocus amount d. The defocus amount d is calculated through the processing described above.

In this manner, the correction values used for signal correction performed in the process of calculating the defocus amount d, the conversion coefficient K that converts the image shift amount p to the defocus amount d, and the like have values that depend on the lens unit characteristics. The focus detection adjustment value is then usually calculated assuming a lens unit with a single optical axis that passes through the center of the image sensor. Note that the optical axis passing through the center of the image sensor indicates a designed or ideal state, and there may be deviations due to manufacturing error and the like. For example, vignetting of incident light caused by the lens frame differs depending on whether there is a single optical axis or a plurality of optical axes, even if the aperture of the lens frame is the same. Therefore, if the focus detection adjustment value is calculated from lens information for a lens unit with two optical axes in the same manner as for a lens unit with one optical axis, the focus detection adjustment value will not be appropriate, and the accuracy of the defocus amount may drop as a result.

In the present embodiment, a drop in the accuracy of the defocus amount is suppressed by using an appropriate focus detection adjustment value, even when an imaging optical system having a plurality of optical axes is mounted to a body having one image sensor. In the present embodiment, the following will be described as examples of focus detection adjustment values for a lens unit having a plurality of optical axes:

a shading correction coefficient for correcting a difference between the intensities of a pair of focus detection signals
   the conversion coefficient K for converting the image shift amount p to the defocus amount d
   a best focus correction value that corrects the focus distance based on the defocus amount However, the concept of the present embodiment can be similarly applied to other focus detection adjustment values as well. The focus detection adjustment value is basically used for each focus detection region, i.e., each imaging optical system.

Shading Correction Coefficient

FIG. 7 is a schematic cross-sectional view of the optical system when the binocular lens unit 300 having two optical axes is mounted to the camera 100 having one image sensor. The binocular lens unit 300 in the present embodiment has two imaging optical systems, and the optical axes of the imaging optical systems are assumed to pass through positions that are on a straight line in the horizontal direction (the direction parallel to the long side of the image sensor) passing through the center of the image sensor (the image capture center) and that are equidistant from the image capture center. Accordingly, FIG. 7 illustrates a horizontal cross-section that includes the center of the image sensor and the two optical axes.

The diameter of the image circle of each imaging optical system is assumed to be approximately ½ the length of the long side of the effective pixel region of the image sensor. FIG. 8A illustrates an example of the signal intensities of the A image signal and the B image signal obtained using the binocular lens unit 300 that is mounted. As illustrated in FIGS. 8A and 8B, there is an optical axis on both the left and right across the center of the image sensor, and thus the signal intensities show discontinuous changes at the center of the image sensor. When an imaging optical system having a single optical axis passing through the center of the image sensor is mounted, the intensity changes in the A image signal and the B image signal are continuous. Therefore, discontinuous intensity changes in the A image signal and the B image signal are characteristic events when an imaging optical system having a plurality of optical axes is mounted for a single image sensor.

FIG. 8B illustrates an example of shading correction values for correcting a difference between the intensities of the A image signal and the B image signal with the intensity changes in FIG. 8A. To correct the A image signal and the B image signal, which have signal intensities that change discontinuously, the shading correction values also change discontinuously at the boundary of the two image circles.

In the present embodiment, the shading correction values for the binocular lens unit 300 having two optical axes are stored in advance in, for example, the non-volatile memory 220 of the camera 100, similar to the shading correction values for the lens unit 200 having one optical axis. The system control unit 218 selects the correction value to be used for shading correction according to the number of optical axes of the lens unit that is mounted. The shading correction value may be calculated in advance for each lens unit model and stored in the non-volatile memory 220 in association with the lens unit identification information. The formula for calculating the correction value according to the number of optical axes may be stored in the non-volatile memory 220, and the shading correction value may be calculated by obtaining information for calculating the shading correction value (e.g., from the mounted lens unit) and applied to the calculation formula.

When calculating the shading correction value, the number of optical axes and the position on the image sensor through which the optical axes pass (called the "optical axis position" hereinafter) are used. In one embodiment, optical information having the optical axis center as the origin is treated as the origin of the optical axis position. Therefore, for a lens unit whose optical axis does not pass through the center of the image sensor, such as the binocular lens unit 300 having a plurality of optical axes, the optical axis position is important when calculating the shading correction value.

In the present embodiment, the optical axis position (Lx, Ly) is obtained from, for example, the binocular lens unit 300, and the optical information of the imaging optical system expressed with the optical axis as the origin is converted to information in the coordinate system of the image sensor. For example, as shown in Table 1, it is assumed that an incident angle of light at a position 10 mm away from the optical axis of 5 degrees (relative to the optical axis), and an optical axis position (Lx, Ly) of (5 mm, 0 mm), is obtained as the optical information of one imaging optical system.

TABLE 1

| OPTICAL INFORMATION | | |
|---|---|---|
| INCIDENT ANGLE | r [mm] | ANGLE [deg.] |
| | 10 | 5 |
| OPTICAL AXIS POSITION | Lx [mm] | Ly [mm] |
| | 5 | 0 |

The optical axis position (5 mm, 0 mm) indicates that the optical axis passes through the position x=5 mm, y=0 mm in an orthogonal coordinate system with the center of the image sensor as the origin. Thus, from the optical information, it can be seen that the incident angle of light at a point on the image sensor 10 mm from the optical axis (e.g., (15 mm, 0 mm) or (−5 mm, 0 mm)) is 5 degrees.

In this manner, by obtaining the optical axis position (Lx, Ly) expressed in the coordinate system of the image sensor, optical information expressed with the optical axis as the origin can be converted into optical information in the coordinate system of the image sensor. The appropriate shading correction value can then be calculated by using the optical information in the coordinate system of the image sensor.

Similar to the shading correction value, conversion coefficients for converting the image shift amount to the defocus amount are stored in advance in, for example, the nonvolatile memory 220 of the camera 100, for the binocular lens unit 300 having two optical axes and the lens unit 200 having one optical axis. For a lens unit having a plurality of optical axes, it is beneficial in terms of conversion accuracy to use conversion coefficients pertaining to the optical axis position closest to the coordinates (or focus detection region) where the correction is applied.

Best Focus Correction Value

An image shot having focused the imaging optical system to a focus distance based on the defocus amount obtained through image plane phase detection-based focus detection may not match the image that is perceived to be in the highest degree of focus as observed by a human. This is thought to be due in part to the fact that the spatial frequency band used to calculate the defocus amount does not match the spatial frequency band used for observation by the human eye. Therefore, a technique is known in which the focus distance detected in the image capture apparatus is corrected to the focus distance at which the image that humans perceive as being in the best in-focus state is obtained. The correction value used to correct the focus distance is called the "best focus correction value"

The best focus correction value may have a value based on the distance from the optical axis position. This is a case where, for example, the best focus correction value is expressed by the following formula according to the relative coordinates (x, y) with the optical axis position as the origin.

$$\text{Best focus correction value} = a00 + a10 * x + a01 * y + a11 * xy$$

Here, a00, a10, a01, and a11 are coefficients. When the optical axis position coincides with the center of the image sensor, the best focus correction value at any set of relative coordinates (x, y) on the image sensor can be calculated using the above formula. The best focus correction value is obtained for the focus detection region, and the focus distance detected for that focus detection region is corrected using the best focus correction value. By adjusting the focus distance of the imaging optical system based on the corrected focus distance, an image that humans perceive as being in the best in-focus state can be obtained.

However, if the optical axis position does not coincide with the center of the image sensor, the best focus correction value cannot be expressed by the above formula. In the present embodiment, the above formula is modified based on the above-described optical axis position (Lx, Ly), which makes it possible to calculate the best focus correction value at any set of relative coordinates (x, y) having the center of the image sensor as the origin, even for imaging optical systems where the optical axis position does not coincide with the center of the image sensor.

Specifically, by modifying the above formula using the optical axis position (Lx, Ly) as follows, the best focus correction value can be calculated for the imaging optical system at the optical axis position (Lx, Ly) at any set of relative coordinates (x, y) having the center of the image sensor at the origin.

Best focus correction value =

$$a00 + a10(x - Lx) + a01(y - Ly) + a11(x - Lx)(y - Ly)$$

By correcting the best focus correction value, which is expressed as a function using coordinates taking the optical axis as the origin, based on the optical axis position, an appropriate correction value can be calculated for a lens unit having an imaging optical system in which the optical axis position differs from the center of the image sensor, such as a lens unit having a plurality of optical axes. Note that the optical axis position (Lx, Ly) expressed in the coordinate system of the image sensor can be obtained from the lens unit through communication. Alternatively, the optical axis position (Lx, Ly), which is stored in advance in the image capture apparatus in association with the identification information of the lens unit, may be obtained through reference based on the identification information of the mounted lens unit. For a lens unit having a plurality of optical axes, accurate correction can be performed by using the best focus correction value corrected using the optical axis position closest to the coordinates (x, y) to be corrected.

The present embodiment has described the shading correction value, the conversion coefficient, and the best focus correction value as focus detection adjustment values assuming that the optical axis position is the center of the image sensor. However, the technical spirit of the present embodiment is correcting the focus detection adjustment value based on the information of the optical axis position, assuming that the optical axis position is the center of the image sensor, and can therefore be applied to any focus detection adjustment value assuming that the optical axis position is the center of the image sensor.

For a lens unit having a plurality of imaging optical systems having different optical axes, in principle, to obtain or store optical information (optical axis position, incident angle, and the like) for each imaging optical system. However, for imaging optical systems that share optical information other than the optical axis position, the storage capacity of the lens unit, the image capture apparatus body, and the like can be reduced by obtaining or storing the optical information other than the optical axis position only for one imaging optical system.

As described above, according to the present embodiment, when a lens unit having a plurality of optical axes is attached to an image capture apparatus having one image sensor, information of the positions in the image sensor through which the respective optical axes pass is used to calculate a correction value for the defocus amount calculation processing. Therefore, an appropriate value can be obtained for a correction value that cannot be obtained through a calculation method which assumes a general lens unit having a single optical axis passing through the center of the image sensor. As a result, accurate image plane phase detection-based focus detection can be realized even when a lens unit having a plurality of optical axes is attached to an image capture apparatus having a single image sensor.

Second Embodiment

A second embodiment of the disclosure will be described next. The first embodiment described being able to realize accurate image plane phase detection-based focus detection even when a lens unit having a plurality of optical axes is attached to an image capture apparatus having a single image sensor. The present embodiment relates to a configuration (a focus guide function) that assists manual focus operations when a lens unit having a plurality of optical axes is attached to an image capture apparatus having a single image sensor.

The focus guide function is a function that presents the position of the focus detection region and the degree of focus in the focus detection region to the user. For example, the position of the focus detection region and the degree of focus can be presented to the user by superimposing a GUI such as an indicator or a mark indicating the position of the focus detection region and the degree of focus on the live view display.

When a normal lens unit 200, which is assumed to have one optical axis passing through the center of the image sensor, is mounted, one image is formed on the image sensor. It is therefore sufficient for the focus guide function to also be provided for a single image. However, when a lens unit having a plurality of optical axes is mounted, a plurality of images are formed on the image sensor. For example, when the binocular lens unit 300 is mounted on the camera 100, two images are formed on the image sensor (the image capturing unit 211).

In this case, if the focus guide function is provided for only one image, it becomes difficult to perform manual focusing accurately on images for which no focus guide is provided. In addition, it is not possible to collectively ascertain the degree of focus of the individual images. Therefore, in one embodiment, a focus guide function suited to cases where a plurality of images are formed on a single image sensor is provided.

An example of the focus guide function provided in the present embodiment is illustrated in FIG. 9. In FIG. 9, a focus guide function provided for each of a right image 800R and a left image 800L of a live view image captured using the right eye optical system 301R and the left eye optical system 301L, respectively. Specifically, indicators 801R and 801L, which indicate information about the position of the focus detection region and the degree of focus, are superimposed on the right image 800R and the left image 800L, respectively. The indicators 801R and 801L are displayed at positions having the same image height. FIG. 9 illustrates an example in which the indicators 801R and 801L are displayed at the same relative coordinates, taking the optical axis position of the corresponding imaging optical system as the origin.

The focus guide function in the present embodiment is provided by the image processing unit 214 under the control of the system control unit 218. Specifically, in parallel with the live view display processing, the image processing unit 214 calculates the defocus amount of the imaging optical system for the focus detection region communicated by the system control unit 218, and outputs the defocus amount to the system control unit 218 along with a reliability. An image of an indicator is then generated based on the display format instructed by the system control unit 218, and the image of the indicator is written to an address region corresponding to the focus detection region in a video memory region of the system memory 219. As a result, an indicator is superimposed on the live view image, which makes it possible to provide the user with information pertaining to the location of the focus detection region, the degree of focus, and the like. Note that calculating the defocus amount for the focus detection region means calculating the defocus amount based on the A image signal and the B image signal obtained from the pixels in the focus detection region.

Specific examples of the indicators provided by the focus guide function will be described next with reference to FIGS. 10A to 10D.

The indicators include a frame-shaped first indicator 500 displayed in the outer periphery of the focus detection region, and a third indicator 502 displayed at a position tangent to a virtual circle 510 that encompasses the focus detection region and has a common center with the focus detection region. The indicators also include has a second indicator 501 that is displayed in a position tangent to a virtual circle 511 having a radius larger than the virtual circle 510 by the length of the third indicator 502.

The first indicator 500 indicates the position and size of the focus detection region, and also indicates whether the focus detection region is in an in-focus state or an out-of-focus state according to the display format.

The second indicator 501 and the third indicator 502 indicate the degree of focus in the focus detection region by the display formats and the positional relationship of the two indicators. Specifically, in addition to the in-focus state and the out-of-focus state, the distinction between focused at the closer side of the subject (front focus) and focused at the infinity side of the subject (back focus), and the amount of deviation from the in-focus state, are presented.

FIG. 10A illustrates an example of the indicator display format when the focus detection region is in an in-focus state. In the in-focus state, the first indicator 500 is displayed as an unbroken frame. The second indicator 501 is a downward-pointing wedge shape, and the third indicator 502 is an upward-pointing wedge shape. The second indicator 501 and the third indicator 502 are displayed on a vertical line passing through the center of the first indicator 500 and facing each other such that the tips thereof touch. In the in-focus state, the second indicator 501 and the third indicator 502 have a display format in which the interiors thereof are filled in. The display formats of the first to third indicators 500 to 502 may vary in attributes other than shape and having or lacking fill, such as color, brightness, flashing or not, and the like, as long as the in-focus state and the out-of-focus state can be visually distinguished. For example, the second indicator 501 and the third indicator 502 can be displayed in green for the in-focus state and white for the out-of-focus state.

FIGS. 10B and 10C illustrate examples of the display formats of the indicators when the reliability of the defocus amount is high in the out-of-focus state.

FIG. 10B illustrates an example of the display format of the indicator for the front focus state. In the out-of-focus state, the first indicator 500 is displayed as a broken frame. The display position of the second indicator 501 does not change from the in-focus state, but the display format is different. An example of a state in which the indicator is filled in the in-focus state, but is empty in the out-of-focus state, is given here. On the other hand, the third indicator 502 is two indicators 502A and 502B, which are displayed in positions distanced to the left (right) from the display position in the in-focus state by a distance corresponding to the magnitude of the defocus amount, respectively. The second indicator 501 points downward to indicate that the camera is in focus closer to the subject, and is in the same display position as in the in-focus state to make it easier to grasp the magnitude of the defocus amount indicated by the indicator 502A (or the indicator 502B).

FIG. 10C illustrates an example of the display format of the indicator for the back focus state. The state is the out-of-focus state, and thus the first indicator 500 is displayed as a broken frame. The display position of the third indicator 502 does not change from the in-focus state, but the display format is different. An example of a state in which the indicator is filled in the in-focus state, but is empty in the out-of-focus state, is given here. On the other hand, the second indicator 501 is two indicators 501A and 501B, which are displayed in positions distanced to the left and right from the display position in the in-focus state by a distance corresponding to the magnitude of the defocus amount, respectively. The third indicator 502 points upward to indicate that the camera is in focus further than the subject, and is in the same display position as in the in-focus state to make it easier to grasp the magnitude of the defocus amount indicated by the indicator 501A (or the indicator 501B).

Note that although the third indicator 502 is described here as being two indicators in the front focus state, the number does not need to be increased. One of the indicator 502A or the indicator 502B in FIG. 10B may simply be displayed (i.e., the display format and the display position of the third indicator 502 may be changed). Similarly, in the back focus state, one of the indicator 501A or the indicator 501B in FIG. 10C may be displayed (i.e., the display format and the display position of the second indicator 502 may be changed).

FIG. 10D illustrates an example of the display format of the indicator when the defocus amount is large and the focus detection result is unreliable (e.g., when there is a large amount of image blur). In this case, neither the front focus/back focus state (defocus direction) nor the magnitude of the defocus amount is presented. The indicators are displayed in a form that informs the user that focus detection sufficient to provide the focus guide function cannot be performed.

Here, the first indicator 500 is in a display format for the out-of-focus state, and the second indicator 501 and the third indicator 502 are in a display format that is different from both the in-focus state and from the out-of-focus state which can present the defocus direction and the defocus amount. Specifically, the shapes of the second indicator 501 and the third indicator 502 are changed from wedge-shaped to a bar or a line having a constant thickness, and are displayed in a different color (e.g., gray) than the other in-focus states. The display positions of the second indicator 501 and the third indicator 502 are predetermined fixed positions. In the example illustrated in FIG. 10D, the third indicator 502 is divided into the two indicators 502A and 502B as in the front focus state, but the number of indicators does not necessarily need to be increased. Note that the reliability of the defocus amount can be calculated by the image processing unit 214 using any publicly-known method. For example, the defocus amount may be considered to be less reliable when the maximum value of the correlation degree is less than a threshold.

Note that in the present embodiment, the focus guide function is provided based on the defocus amount and direction obtained by using a configuration for image plane phase difference-based focus detection. However, the basic technical spirit of the present embodiment does not depend on the method of obtaining the degree of focus in the focus detection region. Therefore, a focus guide function may be provided for each imaging optical system based on other evaluation values that depend on the degree of focus of the image formed by the individual imaging optical system, such as, for example, contrast evaluation values or the like.

Focus Guide Display Control Processing

The focus guide display control processing executed by the system control unit 218 will be described next with reference to the flowchart in FIG. 11. This processing is realized by the system control unit 218 loading a program recorded in the non-volatile memory 220 into the system memory 219 and executing the program. The focus guide display control processing is executed in parallel with the live view display processing.

The focus guide display control processing described here does not depend on the number of optical axes (number of imaging optical systems) included in the mounted lens unit. The focus guide display control processing may be executed for each image formed by the imaging optical system.

In step S601, the system control unit 218 notifies the image processing unit 214 of the position and size of the focus detection region. There is no particular limitation on the method for determining the position and size of the focus detection region when the binocular lens unit 300 having a plurality of optical axes is mounted. Similar to the case where the lens unit 200 having a single optical axis is mounted, the position and size may be specified by the user, set based on a feature region such as a face, or set to a predetermined position and size. However, it is assumed that a focus detection region having the same position and size is set for the image formed by each individual imaging optical system. The image processing unit 214 calculates the defocus amount for the focus detection region communicated by the system control unit 218 as described in the first embodiment.

In step S602, the system control unit 218 obtains, from the image processing unit 214, the defocus amount of the imaging optical system in the focus detection region as well as the reliability thereof. The reliability may be, for example, a correlation amount corresponding to the defocus amount.

In step S604, the system control unit 218 determines whether the reliability of the defocus amount obtained in step S602 is high. The system control unit 218 can determine that the reliability of the defocus amount is high if the obtained reliability is above a predetermined threshold, for example.

The system control unit 218 executes step S605 if the reliability of the defocus amount is determined to be high, and executes step S610 if not.

In step S610, the system control unit 218 determines to display the indicator in a display format for a large defocus state (a fourth display format), and then executes step S611. The fourth display format is the display format illustrated in FIG. 10D.

In step S605, the system control unit 218 determines whether the focus detection region is in the in-focus state or the out-of-focus state. The system control unit 218 can determine that a focus detection region in which the absolute value of the defocus amount is less than or equal to a threshold is in the in-focus state, and that a focus detection region in which the absolute value of the defocus amount exceeds the threshold is in the out-of-focus state. The system control unit 218 executes step S607 if the region is determined to be in the in-focus state, and executes step S606 if the region is determined to be in the out-of-focus state.

In step S607, the system control unit 218 determines to display the indicator in a display format for the in-focus state (a first display format), and then executes step S611. The first display format is the display format illustrated in FIG. 10A.

In step S606, the system control unit 218 determines whether the focus is a front focus state or a back focus state. The system control unit 218 can determine whether the focus is in the front focus state or the back focus state based on the sign of the defocus amount (the defocus direction). The system control unit 218 executes step S608 if the focus is determined to be in the front focus state, and executes step S609 if the focus is determined to be in the back focus state.

In step S608, the system control unit 218 determines to display the indicator in a display format for the front focus state (a second display format), and then executes step S611. The second display format is the display format illustrated in FIG. 10B.

In step S609, the system control unit 218 determines to display the indicator in a display format for the back focus state (a third display format), and then executes step S611. The third display format is the display format illustrated in FIG. 10C.

In step S611, the system control unit 218 determines the display position of the indicator and notifies the image processing unit 214 of the display position along with the display format. The image processing unit 214 generates an image of the indicator according to the display format in accordance with the notification and writes the image of the indicator to the address of the video memory region corresponding to the display position. As a result, the indicator is displayed superimposed on the live view image in the EVF 217 or the display unit 108.

The live view display operations will be described next with reference to the flowchart in FIG. 12. This processing is realized by the system control unit 218 loading a program recorded in the non-volatile memory 220 into the system memory 219 and executing the program. This processing can be executed during live view display, for example, in a shooting standby state, when shooting a moving image, or the like.

In step S701, the system control unit 218 starts the live view display in the EVF 217 or the display unit 108. Specifically, the system control unit 218 controls the image processing unit 214 to generate display images and sequentially write the images into the video memory region of the system memory 219 while the image capturing unit 211 continually shoots a moving image. As a result, the live view image is displayed in the EVF 217 or the display unit 108. The processing from step S702 onward is executed in parallel with the live view display.

In step S702, the system control unit 218 confirms the type (number of optical axes) of the lens unit that is mounted. The system control unit 218 confirms lens type information by communicating with the lens system control circuit 205 or 303 via the communication terminal 124 and the communication terminal 206 or 306. The lens type information is assumed to include information that can identify the lens unit model and the number of optical axes. Note that the lens type information is included in lens information transmitted from the lens unit to the camera 100 when the camera 100 is turned on, when the lens unit is replaced, or the like. Therefore, in step S702, the system control unit may refer to lens information which has already been obtained, rather than communicating with the lens unit.

The system control unit 218 executes step S703 if it is determined that a lens unit having one optical axis is mounted, and executes step S704 if it is determined that a lens unit having a plurality of optical axes (two, here) is mounted.

In step S703, the system control unit 218 executes the focus guide display processing for a lens unit having one optical axis (a normal lens unit). The focus guide display processing may be the focus guide display control processing described with reference to the flowchart in FIG. 11. As a result, one focus guide is displayed in the live view image formed by one imaging optical system.

In steps S704 and S705, the system control unit 218 performs the focus guide display processing for each of the images (the left image and the right image) formed by the two imaging optical systems. Specifically, the system control unit 218 performs the focus guide display processing for the left image in step S704 and performs the focus guide display processing for the right image in step S705. The focus guide display processing for the individual images may be the focus guide display control processing described with reference to the flowchart in FIG. 11. As a result, an indicator 801L is displayed on the left image 800L, and an indicator 801R is displayed on the right image 800R, of a live view image 800 illustrated in FIG. 9. The indicators 801L and 801R are displayed at the same position in the image.

In step S706, the system control unit 218 determines whether an operation for ending the live view display has been detected. If the system control unit 218 determines that the ending operation has been detected, the live view display is ended, whereas if the system control unit 218 does not determine that the ending operation has been detected, the processing is repeated from step S702, and the live view display is continued. Although the processing is described here as being repeated from step S702, after the processing of step S702 is performed once, steps S703 and S706, or steps S704 to S706, may be repeated, according to the determination result from step S702, until the lens unit is removed.

As described thus far, in the present embodiment, a focus guide for each live view image formed by the imaging optical system is displayed according to the number of optical axes of the mounted lens unit. Therefore, when the binocular lens unit 300 having two optical axes (imaging optical systems) is mounted, focus guides are displayed for both the left image and the right image of the live view image.

According to the present embodiment, when, for example, the binocular lens unit 300 is attached to the camera 100 to shoot images for VR180, a focus guide is displayed in each of the two live view images on the screen. This makes it easy to ascertain the degree of focus in individual live view images. Additionally, when adjusting the focus distance of the imaging optical systems, if the focus distances of all the imaging optical systems are adjusted in tandem, an image to be focused can be selected. When the focus distance can be adjusted for each imaging optical system, the focus distance can be accurately adjusted for each imaging optical system. In both cases, the manual focus operations can be effectively assisted when a multi-scopic lens is mounted.

Although the defocus amount obtained as a result of focus detection is used to display the focus guide in the present embodiment, the defocus amount may be calculated using the correction value described in the first embodiment in order to calculate this defocus amount. This makes it possible to realize a focus guide display that indicates the in-focus state with greater accuracy.

Third Embodiment

A third embodiment of the disclosure will be described next. The present embodiment relates to a guide function for manually adjusting a difference in the degree of focus between imaging optical systems.

FIGS. 13A to 13D are diagrams illustrating examples of indicators provided by the focus guide function during live view display when the binocular lens unit 300 is mounted in the present embodiment. In the present embodiment, an indicator of the difference in the degree of focus in the focus detection region between the left image and the right image is provided.

Specifically, an indicator of the difference in the degrees of focus is displayed based on the defocus amounts of the left eye optical system 301L and right eye optical system 301R, which are obtained in the focus guide display processing in steps S704 and S705 of FIG. 12. As illustrated in FIGS. 13A to 13D, the indicator has an axis 900, an indicator 901 indicating an origin (difference=0), positive and negative indicators 902 and 903 indicating the direction of the difference, and a mark 904 indicating the actual difference in the degrees of focus.

The difference in the degrees of focus is expressed as a relative value and direction with respect to the defocus amount for one imaging optical system. For example, if the defocus amount of the left eye optical system 301L is used as a reference, the difference in the degrees of focus can be obtained by the following formula.

Difference in degrees of focus=defocus amount of right eye optical system 301R–defocus amount of left eye optical system 301L

The sign of the difference in the degrees of focus is assumed to be positive for front focus and negative for back focus. Therefore, the difference in the degrees of focus is a positive value if the other image (the right image) is in front focus with respect to the reference image (the left image), and negative if the other image (the right image) is in back focus with respect to the reference image (the left image).

Figure 13A:
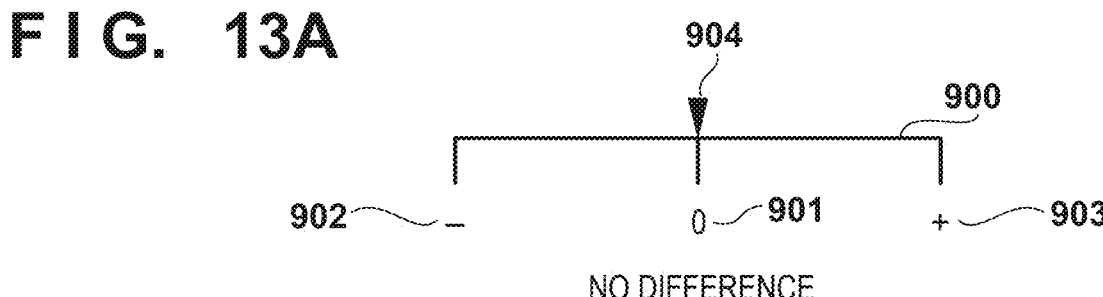
FIGS. 13A to 13D are diagrams illustrating examples of display formats of indicators that present a difference in the degree of focus between left and right images according to a third embodiment.

FIG. 13A is an example of a first display format of the indicator when it is determined that the degrees of focus of the left image and the right image (the defocus amounts of the left eye optical system 301L and the right eye optical system 301R) are the same (no difference). If the difference in the degrees of focus is determined to be zero, the mark 904 is positioned on the axis 900 to point to the position indicated by the indicator 901 (a reference position). If the difference in the degrees of focus is determined to be 0, the color, a visual effect (flashing or not), and the like of the indicator may be different from in other cases. For example, if the difference in the degrees of focus is determined to be 0, the indicator can be set to green, and otherwise, the indicator can be set to white.

Figure 13B:
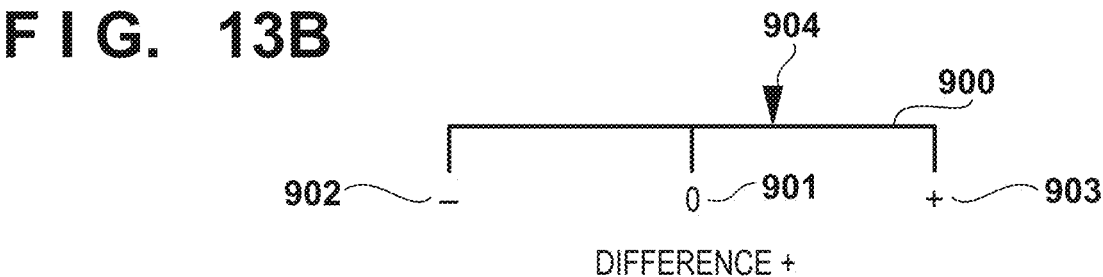
Figure 13C:
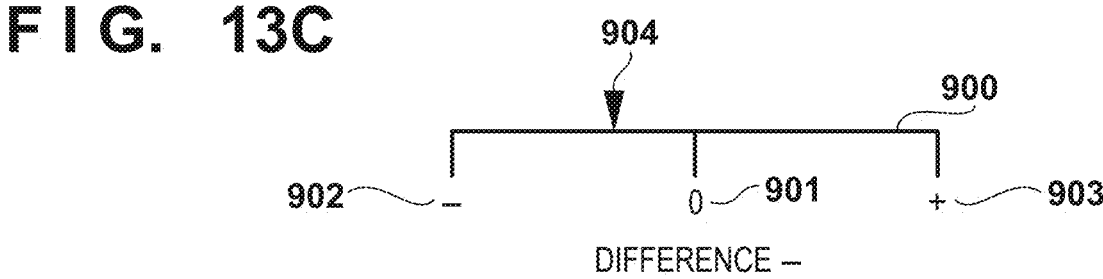

FIGS. 13B and 13C illustrate examples of a second display format and a third display format, respectively. These display formats are used to indicate the magnitude and direction of the difference in the degrees of focus based on the difference in the defocus amount when the difference in the degrees of focus is not zero but the reliability of the defocus amount is high.

FIG. 13B illustrates an example of the second display format of the indicator when the focus distance of the other image (the right image) is shifted to the near side (the positive direction) with respect to the reference image (the left image), i.e., when the right image is in a front focus state with respect to the left image. In this case, the mark 904 is positioned to point to a position shifted a distance corresponding to the difference in the degrees of focus, on the right of the indicator 901 (the positive direction).

FIG. 13C illustrates an example of the third display format of the indicator when the focus distance of the other image (the right image) is shifted to the infinity (the negative direction) with respect to the reference image (the left image), i.e., when the right image is in a back focus state with respect to the left image. In this case, the mark 904 is positioned to point to a position shifted a distance corresponding to the difference in the degrees of focus, on the left of the indicator 901 (the negative direction).

In the second display format and the third display format, the magnitude and direction of the difference in the relative degrees of focus between the left image and the right image can be indicated to the user by the position of the mark 904. Specifically, the magnitude of the difference in the degrees of focus can be indicated by the distance of the mark 904 from the position on the axis 900 pointed to by indicator 901, which indicates the reference point where the difference is zero. Whether the focus distance of the other image is shifted to the near side or infinity side with respect to the reference image can be indicated according to whether the mark 904 is positioned to the right or the left of the position on the axis 900 pointed to by the indicator 901.

Figure 13D:
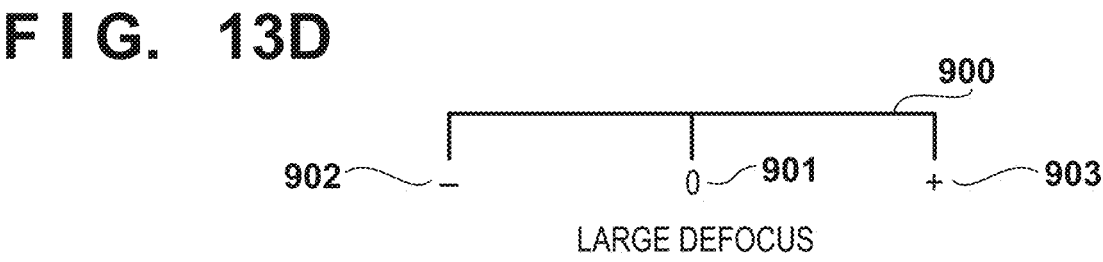

FIG. 13D illustrates an example of a fourth display format of the indicator in a case where the reliability of the defocus amount for at least one of the imaging optical systems is low, such as when the left image, the right image, or both are significantly blurred. In this case, the reliability of the difference in the degrees of focus obtained through the above formula is also low, and thus the mark 904 indicating the magnitude and direction of the difference in the degrees of focus is not displayed. Of the indicators, for the axis 900 and the indicators 901 to 903, which are displayed, the color, visual effect (flashing or not), and the like may be different in the fourth display format from those in the first to third display formats. For example, the display color can be set to gray.

The display formats illustrated in FIGS. 13A to 13D are merely examples, and the difference in the degrees of focus may be indicated using indicators in other formats, such as displaying the difference in the degrees of focus using numerical values, using differently-shaped marks or indicators, or the like Display control processing for the difference in the degree of focus between the left and right images, executed by the system control unit 218, will be described next with reference to the flowchart in FIG. 14. This processing is executed when the binocular lens unit 300 is mounted to the camera 100. Additionally this processing is realized by the system control unit 218 loading a program recorded in the non-volatile memory 220 into the system memory 219 and executing the program. The display control processing for the difference in the degree of focus between the left and right images is executed in parallel with the live view display processing. The processing can also be executed in parallel with the focus guide display control processing described in the second embodiment.

In step S1001, the system control unit 218 obtains the defocus amount, and the reliability thereof, for the right eye optical system 301R and the left eye optical system 301L from the image processing unit 214. If the focus guide display control processing is being executed, the defocus amount and reliability obtained in step S602 of FIG. 11 may be referenced. The system control unit 218 then determines whether the reliability of at least one of the defocus amounts is low. If the system control unit 218 determines that the reliability of at least one of the defocus amounts is low, step S1008 is executed, and if not, step S1002 is executed.

In step S1002, the system control unit 218 calculates the difference in the degrees of focus with respect to one of the left and right images. When the left image is used as a reference, the system control unit 218 can calculate the difference in the degrees of focus using the calculation formula described above. Once the difference in the degrees of focus is calculated, the system control unit 218 executes step S1003.

In step S1003, the system control unit 218 determines whether the difference in the degrees of focus calculated in step S1002 is 0; if the difference is determined to be 0, step S1005 is executed, and if the difference is not determined to be 0, step S1004 is executed.

In step S1004, the system control unit 218 determines whether the sign of the difference in the degrees of focus calculated in step S1002 is positive or negative. The system control unit 218 executes step S1006 if the sign of the difference is determined to be positive, and executes step S1007 if the sign of the difference is determined to be negative.

In step S1005, the system control unit 218 determines to display the indicator in the first display format (FIG. 13A), and then executes step S1009.

In step S1006, the system control unit 218 determines to display the indicator in the second display format (FIG. 13B), and then executes step S1009.

In step S1007, the system control unit 218 determines to display the indicator in the third display format (FIG. 13C), and then executes step S1009.

In step S1008, the system control unit 218 determines to display the indicator in the fourth display format (FIG. 13D), and then executes step S1009.

In step S1009, the system control unit 218 notifies the image processing unit 214 of the display format of the indicator determined in steps S1005 to S1008 and the display position of the mark 904 according to the difference in the degrees of focus. The image processing unit 214 generates an image of the indicator according to the display format in accordance with the notification and writes the image of the indicator to the address of the video memory region corresponding to a predetermined display position of the indicator. As a result, the indicator, which indicates the difference in the degree of focus between the left and right images, is displayed superimposed on the live view image in the EVF 217 or the display unit 108.

Figure 15:
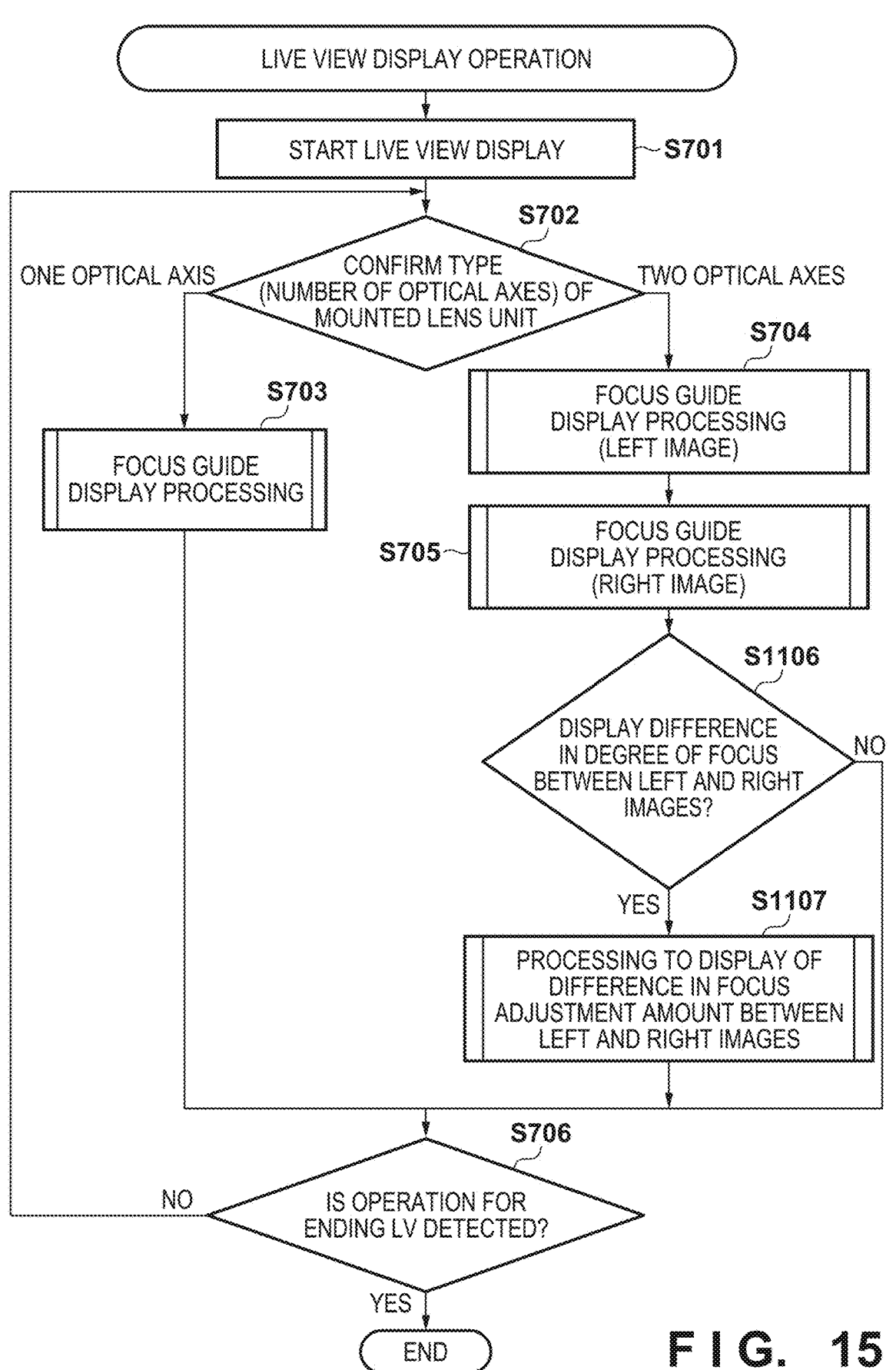
FIG. 15 is a flowchart pertaining to live view display operations according to the third embodiment.

Live view display operations according to the present embodiment will be described next with reference to the flowchart in FIG. 15. In FIG. 15, operations similar to those in the second embodiment are given the same reference signs as those in FIG. 12. This processing is realized by the system control unit 218 loading a program recorded in the non-volatile memory 220 into the system memory 219 and executing the program. This processing can be executed during live view display, for example, in a shooting standby state, when shooting a moving image, or the like.

The processing of steps S701 to S705 is the same as in the second embodiment, and will therefore not be described here. After the focus guide display processing for the right image in step S705 is complete, in step S1106, the system control unit 218 determines whether to display the difference in the degree of focus between the left and right images.

Whether to display the difference in the degree of focus between the left and right images may, for example, be an item set by the user, or may be determined by the system control unit 218 according to the operating mode of the camera 100. For example, if a moving image mode of the camera 100 is set to an adjustment mode for the user to adjust the difference in the degree of focus between the imaging optical systems of the binocular lens unit 300, the system control unit 218 determines that the difference in the degree of focus between the left and right images is to be displayed. In the adjustment mode, the user can adjust the focus distances of the right eye optical system 301R and the left eye optical system 301L by, for example, operating individual focus rings, in order to eliminate differences between the focus distances of the right eye optical system 301R and the left eye optical system 301L.

The system control unit 218 executes step S1107 if it is determined that the difference in the degree of focus between the left and right images is to be displayed, and executes step S706 if not.

In step S1107, the system control unit 218 executes the display control processing described with reference to the flowchart in FIG. 14. The user can adjust the focus distance of the imaging optical system that forms the image which is not the reference image (the right eye optical system 301R, in this case) while viewing the displayed indicator so as to eliminate any difference in the degrees of focus.

FIG. 16 is a diagram illustrating an example of the live view display in step S1107. Similar to the second embodiment, one focus guide 1201L and 1201R are displayed for a left image 1200L and a right image 1200R in one frame of a live view image 1200 obtained by the image sensor constituting the image capturing unit 211. In the present embodiment, furthermore, an indicator 1202 indicating the difference in the degree of focus between the left and right images is displayed between the left image 1200L and the right image 1200R.

The processing of step S706 is similar to that of the second embodiment, and will therefore not be described here. In the present embodiment, when the binocular lens unit 300 is mounted to the camera 100, an indicator is displayed indicating the magnitude and direction of the difference in the degrees of focus of the two imaging optical systems or images. Therefore, the user can easily recognize a shift in the focus distance of the imaging optical systems caused by aging or the like. The user can adjust the focus distance gap between the imaging optical systems while viewing the indicators so as to bring the gap to zero.

The second and third embodiments describe assisting manual focus operations by displaying a focus guide. However, the basic technical spirit is to provide some kind of display to assist shooting for the images formed by the individual imaging optical systems when a multi-scopic lens unit is mounted, and the display content is not limited to a focus guide indicating the degrees of focus. For example, a peaking pattern indicating overexposed or underexposed regions may be displayed superimposed on the live view image.

With respect to the present embodiment too, the calculation of the defocus amount used to display the focus guide may also be performed using the correction values described in the first embodiment. This makes it possible to realize a focus guide display that indicates the in-focus state with greater accuracy.

Fourth Embodiment

A fourth embodiment of the disclosure will be described next. The present embodiment relates to an indicator that collectively indicates the degrees of focus and the difference between the degrees of focus for individual images.

FIGS. 17A to 17D illustrate examples of first to fourth display formats of the indicator according to the present embodiment.

The indicator has an axis 1700, an indicator 1701 that is located near the center of the axis 1700 and that indicates the in-focus position, and indicators 1702 and 1703 that are located near respective ends of the axis 1700 and that indicate the back focus state and the front focus state, respectively. The indicator furthermore has a mark 1704 indicating the degree of focus of the right image, and a mark 1705 indicating the degree of focus of the left image, located near the top and bottom of the axis 1700 to indicate the positions thereof on the axis 1700.

FIG. 17A is an example of a first display format when both the right image and the left image are in an in-focus state (the defocus amount is 0 for both the right eye optical system 301R and the left eye optical system 301L). In this case, there is no difference in the degrees of focus between the right image and the left image, and thus the marks 1704 and 1705 are positioned to point to the same position on the axis 1700. Because the defocus amount is zero, the marks 1704 and 1705 are positioned so as to point to the position on the axis 1700 indicated by the indicator 1701. In this case, at least part of the indicator may be displayed using a different color, visual effect, or the like from the other display format, similar to the first display format used when in focus in the second embodiment.

FIG. 17B is an example of a second display format when there is no difference in the degree of focus between the right image and the left image, but the images are in a front focus state. In this case, there is no difference in the degree of focus between the right image and the left image, and thus as with the first display format, the marks 1704 and 1705 are positioned to point to the same position on the axis 1700. Because the state is the front focus state, the marks 1704 and 1705 are positioned so as to point to a position on the axis 1700 shifted to the indicator 1703 side end, further than the position on the axis 1700 to which the indicator 1701 points, by a distance corresponding to the magnitude of the defocus amount. To bring the left and right images into the in-focus state with no difference in the degree of focus between the left and right images, a display may be made to prompt the user to drive the focus ring to adjust the focus distances of the right eye optical system 301R and left eye optical system 301L simultaneously.

FIG. 17C is an example of a third display format when there is a difference in the degree of focus between the right image and the left image, and neither image is in an in-focus state. Here, both the right image and the left image are assumed to be in the front focus state. In this case, the mark 1704 is positioned so as to point to a position on the axis 1700 shifted to the indicator 1703 side end, further than the position on the axis 1700 to which the indicator 1701 points, by a distance corresponding to the magnitude of the defocus amount of the right eye optical system 301R. Likewise, the mark 1705 is positioned so as to point to a position on the axis 1700 shifted to the indicator 1703 side end, further than the position on the axis 1700 to which the indicator 1701 points, by a distance corresponding to the magnitude of the defocus amount of the left eye optical system 301L. In the example illustrated in FIG. 17C, the left eye optical system 301L has a larger defocus amount, and thus the mark 1705 is positioned to point to a position closer to the indicator 1703 side end on the axis 1700 than the mark 1704.

While looking at the indicator, the user adjusts the focus distance of the left eye optical system 301L such that the marks 1704 and 1705 point to the same position on the axis 1700. The left and right images can then be brought into focus by simultaneously adjusting the focus distance of the right eye optical system 301R and the left eye optical system 301L.

In the present embodiment, the degrees of focus of the right image and the left image and the difference therebetween, as well as whether the camera is in a front focus state or a back focus state relative to the in-focus state, can be presented to the user by the positions on the axis 1700 pointed to by the marks 1704 and 1705.

In the present embodiment, the magnitude and direction of the defocus amount of the right eye optical system 301R and left eye optical system 301L are presented independently by the marks 1704 and 1705, and it is therefore not necessary to calculate the difference in the degrees of focus calculated in the foregoing embodiments. The system control unit 218 can determine the positions on the axis 1700 to which the marks 1704 and 1705 are to point (i.e., the display positions of the marks 1704 and 1705) based on the defocus amounts, and the signs thereof, of the right eye optical system 301R and the left eye optical system 301L.

FIG. 17D illustrates an example of a fourth display format of the indicator in a case where the reliability of the defocus amounts of the right eye optical system 301R and the left eye optical system 301L is low, such as when the right image, the left image, or both are significantly blurred. In this case, the reliability of the defocus amount is low, and thus the marks 1704 and 1705 are not displayed. Of the indicators, for the axis 1700 and the indicators 1701 to 1703, which are displayed, the color, visual effect (flashing or not), and the like may be different in the fourth display format from those in the first to third display formats. For example, the display color can be set to gray.

Although not illustrated here, if the reliability of the defocus amount of one of the right eye optical system 301R and the left eye optical system 301L is low and the reliability of the defocus amount of the other is high, the mark 1704 or 1705 based on the defocus amount having the higher reliability may be displayed.

Note that the display formats illustrated in FIGS. 17A to 17D are merely examples. The degrees of focus and the difference therebetween may be indicated using indicators in other formats, such as indicating the defocus amounts and directions of the right eye optical system 301R and the left eye optical system 301L as values, using marks and indicators having different shapes, and so on.

The system control unit 218 can display the indicator according to the present embodiment in step S1107, for example, in live view display operations in which the processing of steps S704 and S705 has been removed from the flowchart in FIG. 15 described in the third embodiment. In this case, in step S1107, the system control unit 218 obtains the defocus amount and the reliability thereof for each imaging optical system from the image processing unit 214. If the reliabilities are all low, the fourth display format is determined to be used. If the reliabilities of the defocus amounts are all high, the system control unit 218 determines to use the first display format if the defocus amounts are all zero, the second display format if the defocus amounts are all non-zero and there is no difference, and the third display format if there is a difference in the defocus amounts. When the first through third display formats are determined to be used, the system control unit 218 also determines the display positions of the marks 1704 and 1705. The system control unit 218 then notifies the image processing unit 214 of the determined display format and, if the marks 1704 and 1705 are to be displayed, the display positions thereof.

FIG. 18 is a diagram illustrating an example of the live view display in the present embodiment. Focus guides 1801L and 1801R are displayed for a left image 1800L and a right image 1800R, respectively, in one frame of a live view image 1800 obtained by the image sensor constituting the image capturing unit 211. In the present embodiment, an indicator 1802 is further displayed between the left image 1800L and the right image 1800R, indicating the difference in the degree of focus between the left and right images, as well as the magnitude and direction of the defocus amount for each imaging optical system.

In addition to the effects of the third embodiment, the present embodiment presents the magnitude and direction of the defocus amount for each imaging optical system in a different format from the second embodiment, and thus the user can obtain the necessary information by referring to an indicator that is easy for them to understand.

In the present embodiment as well, the basic technical spirit is to provide some kind of display to assist shooting for the images formed by the individual imaging optical systems when a multi-scopic lens unit is mounted, and the display content is not limited to the degrees of focus, the difference therebetween, and so on. For example, a peaking pattern indicating overexposed or underexposed regions may be displayed superimposed on the live view image.

Fifth Embodiment

A fifth embodiment of the disclosure will be described next. The present embodiment relates to a technique for automatically adjusting the difference in the degree of focus between imaging optical systems when a multi-scopic lens unit is mounted.

In the third embodiment, the difference in the degree of focus between the right eye optical system 301R and the left eye optical system 301L (the difference in the defocus amounts obtained for the right image and the left image, respectively) was obtained. Using this difference, the difference in the degree of focus between the imaging optical systems (focus distance shift) can be automatically adjusted by adjusting the focus lens of the right eye optical system 301R or the left eye optical system 301L.

FIG. 19 is a flowchart pertaining to processing for adjusting shift between imaging optical systems, executed by the system control unit 218. This processing is realized by the system control unit 218 loading a program recorded in the non-volatile memory 220 into the system memory 219 and executing the program. The shift adjustment processing may be executed in response to a user instruction, or executed automatically at a predetermined timing. An example of the predetermined timing may be when the system control unit 218 determines that the mounted lens unit is a multi-scopic lens unit (e.g., when the lens unit is replaced, when the camera 100 is started up, and the like).

When the operating mode of the camera 100 is the adjustment mode described in the third embodiment, the user adjusts the shift between the imaging optical systems through a manual operation. Therefore, the shift adjustment processing executed automatically by the system control unit 218 in the present embodiment may be executed when the operating mode is not the adjustment mode. Note that the shift adjustment processing is executed in parallel with the live view display operations.

In step S1901, the system control unit 218 sets one of the right eye optical system 301R and the left eye optical system 301L of the binocular lens unit 300 as a reference imaging optical system. For example, assume that the binocular lens unit 300 can drive the right eye optical system 301R and the left eye optical system 301L in tandem, or can drive only the left eye optical system 301L, through focus ring operations. In this case, the system control unit 218 is set to use the right eye optical system 301R, which cannot be driven independently, as a reference.

The system control unit 218 may also set the imaging optical system corresponding to an eye set in advance as the user's dominant eye as the reference imaging optical system. Alternatively, if there is a difference in the subject detection accuracy, the focus detection accuracy, or the like between the right eye optical system 301R and the left eye optical system 301L, the imaging optical system having the higher accuracy may be set as the reference.

In step S1902, the system control unit 218 obtains the current focus detection region information for each of the right eye optical system 301R and the left eye optical system 301L, held in the system memory 219. If the focus detection regions for the right eye optical system 301R and the left eye optical system 301L are set to the same position with respect to the optical axis, it is sufficient to read out the information of one of the focus detection regions. The system control unit 218 notifies the image processing unit 214 of the information of the focus detection region information, and instructs the image processing unit 214 to calculate the defocus amount. The image processing unit 214 calculates the defocus amount and the reliability thereof based on the signals from the focus detection region for the right image and the left image, respectively, as described above.

In step S1903, the system control unit 218 obtains a defocus amount DEF_L of the left eye optical system 301L and a defocus amount DEF_R of the right eye optical system 301R from the image processing unit 214.

In step S1904, the system control unit 218 calculates the difference, from the defocus amount of the imaging optical system set as the standard in step S1901, of the defocus amount of the other imaging optical system. For example, if the right eye optical system 301R is set as the reference in step S1901, the system control unit 218 calculates a difference DEF_dif in the defocus amount through the following formula.

$$DEF\_dif = DEF\_L - DEF\_R$$

Next, in step S1905, the system control unit 218 drives the focus lens of the imaging optical system that is not the reference (in this case, the left eye optical system 301L) in the optical axis direction by PLS_dif, which is a drive amount and drive direction corresponding to DEF_dif detected in step S1904. The lens drive amount PLS_dif is obtained, for example, as follows.

$$PLS\_dif = DEF\_dif / SENS\_L$$

Here, SENS_L is a conversion coefficient for converting the defocus amount of the imaging optical system that is not the reference (i.e., the imaging optical system to be adjusted; here, the left eye optical system 301L) into a lens drive amount, and is stored in the lens unit in advance. The binocular lens unit 300 holds a focus sensitivity for each of the right eye optical system 301R and the left eye optical system 301L in non-volatile memory inside the lens system control circuit 303. When a plurality of imaging optical systems having the same configuration are used, as in the binocular lens unit 300, one focus sensitivity may be used in common for each individual imaging optical system.

Through the above-described processing, automatic adjustments can be made to eliminate differences in the degree of focus between the imaging optical systems (i.e., shifts in the focus distance). According to the present embodiment, the difference in the degree of focus between the imaging optical systems (shifts in the focus distance), which was adjusted manually in the third embodiment, can be adjusted automatically, which saves the user effort related to the adjustment and improves the usability.

Sixth Embodiment

A sixth embodiment of the disclosure will be described next. The present embodiment provides a focus calibration function for when a multi-scopic lens unit is mounted.

FIGS. 20A and 20B illustrate the indicators described with reference to FIGS. 17A to 17D in the fourth embodiment. FIG. 20A illustrates the third display format, with the marks 1704 and 1705 indicating that the right image is in an in-focus state but the left image is in a front focus state. Assume that from this state, the user adjusts the focus distance of the left eye optical system 301L by operating the focus ring so that the mark 1704, which indicates the degree of focus of the left image, comes to the position pointed to by the indicator 1701 (so that the indicator is in the state illustrated in FIG. 20B).

This should result in both the right image 1800R and the left image 1800L of the live view image 1800 displayed in FIG. 18, for example, being in the in-focus state. However, factors such as manufacturing error, age-related deterioration, the environment, and the like of the constituent elements such as the lenses, reflective mirrors, and the like in each of the right eye optical system 301R and the left eye optical system 301L can result in a discrepancy between the calculated defocus amount and the degree of focus of the image.

Therefore, a situation may arise where the user feels that the right image and/or left image observed through the display unit 108, the EVF 217, or the like are not in an in-focus state, even though the marks 1704 and 1705 indicate that the images are in an in-focus state. In particular, if the degree of focus of one image is lower than the degree of focus of the other image, the two images are displayed adjacent to each other, which makes it easier for the user to notice the difference in the degree of focus. Accordingly, the present embodiment provides a function for correcting for the difference between the state in which an image that the user perceives as being in an in-focus state is obtained and the state in which the camera 100 determines that the image is in an in-focus state (the focus calibration function).

In the present embodiment, a correction value for compensating for the difference between the state in which an image that the user perceives as being in an in-focus state is obtained and the state in which the camera 100 determines that the image is in an in-focus state will be called a "calibration value". The calibration value can be set and held independently for the right eye optical system 301R and the left eye optical system 301L.

FIGS. 21A to 21C are diagrams illustrating examples of a calibration guide displayed in the display unit 108, the EVF 217, or the like when the focus calibration function is executed. For ease of description and understanding, it is assumed here that the focus lens of the left eye optical system 301L and the focus lens of the right eye optical system 301R can be driven independently. However, the focus calibration function can be implemented even in a configuration in which the focus lenses of both imaging optical systems are driven in tandem and the focus lens of one imaging optical system can be driven independently. In this case, the imaging optical system for which the focus lens cannot be driven independently may be calibrated first, and the remaining imaging optical system may be calibrated thereafter.

FIG. 21A illustrates an example of a first display format of a calibration guide 2110. The calibration guide 2110 has an axis 2100 corresponding to a range of calibration values. The axis 2100 is provided with scales, with some of the scales indicating values. Here, an indicator 2101 indicating a calibration value of 0, an indicator 2102 indicating a negative maximum value (−20, here), and an indicator 2103 indicating a positive maximum value (+20, here) are displayed near the bottom of the axis 2100. The sign of the calibration value is assumed to be positive for the front focus direction and negative for the back focus direction, such that the positional relationship between the mark and the reference is equivalent to that in FIGS. 17A to 17D. Note that indicators for values other than these may be added. In the example in FIG. 21A, indicators indicating −10 and +10 are added.

Additionally, a mark 2104 indicating the calibration value of the right eye optical system 301R, and a mark 2105 indicating the calibration value of the left eye optical system 301L, are provided near the axis 2100. Furthermore, marks 1704 and 1705 indicating the degrees of focus of the right eye optical system 301R and the left eye optical system 301L are provided on the axis 2100. Here, the display positions of the marks 1704 and 1705 are determined with the position of a calibration value of 0 corresponding to a defocus amount of 0. An indicator 2106, which numerically indicates the difference in the calibration values of the right eye optical system 301R and the left eye optical system 301L, is provided near the left end of the axis 2100. Here, the relative value of the calibration value of the right eye optical system 301R when the calibration value of the left eye optical system 301L is set to 0 is indicated as the difference in the calibration values.

FIG. 21A illustrates a state in which the defocus amount for both the right eye optical system 301R and left eye optical system 301L is 0, but the focus lens position has been corrected using the calibration value. Specifically, the focus lens position corresponding to a defocus amount of 0 is corrected by 2 in the front focus direction (+) for the right eye optical system 301R and by 4 in the back focus direction (−) for the left eye optical system 301L. Here, the unit of the calibration value is set in advance by the camera 100. For example, the unit may be the number of pulses used when driving the focus lens.

The user adjusts the focus lens positions of the right eye optical system 301R and the left eye optical system 301L, respectively, while observing, for example, the right image 1800R and the left image 1800L of the live view image 1800 in a state where the marks 1704 and 1705 indicate the in-focus state. Then, when the user feels that the degree of focus in the focus detection region of the right image 1800R and the left image 1800L is highest, the user provides an instruction to the camera 100 through the operation members 230. Upon detecting the instruction, the system control unit 218 stores the calibration values of the right eye optical system 301R and left eye optical system 301L at that time in the non-volatile memory 220.

Based on the calibration value stored in the non-volatile memory 220, the system control unit 218 corrects the lens drive amount that is based on the defocus amount, and then sends the corrected lens drive amount to the lens system control circuit 303. As a result, the user can obtain an image they feel has the highest degree of focus when the defocus amount is 0. In other words, it is possible to correct for discrepancies between the degree of focus perceived by the user and the degree of focus determined by the camera 100.

FIG. 21B illustrates an example of a second display format of the calibration guide 2110. The second display format indicates the information presented in the first display format for each imaging optical system. Specifically, axes 2100R and 2100L are provided for the respective imaging optical systems; a mark 1704 (1705) indicating the degree of focus and a mark 2104 (2105) indicating the calibration value are provided on the corresponding axes. Instead of the indicator 2106, which indicates the difference in calibration values, indicators 2106R and 2106L, which indicate the calibration values for the respective imaging optical systems, are provided on the corresponding axes 2100R and 2100L. In the second display format, information is presented for each imaging optical system, and the display region is therefore large, but the user can easily understand the information. Note that information pertaining to one imaging optical system may be displayed in response to user instructions.

FIG. 21C illustrates an example of a third display format of the calibration guide 2110. This display format is similar to the first display format illustrated in FIG. 21*a*, but both marks 1704 and 1705 are in a +4 position, and are in a front focus state. The marks 2104 and 2105, which indicate the calibration values, are in position corresponding to when the marks 1704 and 1705 are in a position where the defocus amount is 0 (FIG. 21A). If the marks 1704 and 1705 are not at the position of a defocus amount of 0, the marks 2104 and 2105 indicate calibration values resulting from the difference in position from the marks 1704 and 1705. Accordingly, in FIG. 21C, the calibration value for the right eye optical system 301R is −2, and the calibration value for the left eye optical system 301L is 0. Note that the calibration value may be indicated by the display position of the marks 2104 and 2105 regardless of the defocus amounts of the right eye optical system 301R and left eye optical system 301L.

A method for focus calibration in the state where the defocus amounts of the right eye optical system 301R and left eye optical system 301L are not zero will be described with reference to FIGS. 22A and 22B.

FIG. 22A illustrates an example of a sample image corresponding to the degree of focus in FIG. 21C. When performing focus calibration in a state where the defocus amount is not zero, the system control unit 218 displays a sample image corresponding to the current degree of focus and a live view image (FIG. 22B) in the display unit 108 or the EVF 217.

The sample image in FIG. 22A is not necessary when calibrating in the in-focus state as illustrated in FIG. 21A. The sample image in FIG. 22A is, for example, an image corresponding to the current degree of focus, which is predicted from the design state of the imaging optical system by using a stored line image previously recorded in the non-volatile memory 220.

The user compares the image in FIG. 22A with the live view images in FIG. 22B (a left image 2201L and a right image 2201R). For example, if only the amount of blur in the right image 2201R of the live view image in FIG. 22B appears to be large, the user adjusts the focus lens position of the right eye optical system 301R to a position where they feel that the right image 2201R is in focus to the same degree as the left image 2201L. This sets the calibration value for the right eye optical system 301R.

FIG. 21C corresponds to an example of the display of the calibration guide after the calibration value for the right eye optical system 301R has been set in this manner. By setting the calibration amount of the right eye optical system 301R to −2 from the original value (0), the blurred states of the left and right images are matched and the desired image can be obtained. Rather than displaying a sample image, the focus lens position of the imaging optical system that forms the other image may be adjusted so that the degree of focus is equivalent to the one of the left image and the right image in the live view image that is perceived to be in focus to a higher degree.

Additionally, the calibration values may be stored in at least one of the camera 100 and the binocular lens unit 300. This makes it possible to obtain the calibration values from the binocular lens unit 300 and use the values in a different camera from the camera for which the calibration of the binocular lens unit 300 was executed.

According to the present embodiment, calibration values that correct the focus lens position can be set for the imaging optical systems of the binocular lens unit. It is therefore possible to compensate for differences between the in-focus state determined by the camera and the in-focus state perceived by the user for the binocular lens unit.

Seventh Embodiment

A seventh embodiment of the disclosure will be described next. The present embodiment relates to a focus calibration function when a parallax image pair, such as the left image and the right image shot by the binocular lens unit 300, are recorded in a refocusable format. A refocusable image is an image in which it is possible to change the subject distance at which the image comes into focus after the image has been shot (recorded). For example, the image may be an image shot with a light field camera, an image recorded in association with a group of images shot of the same scene at different focus distances, or the like.

The focus calibration function provided by the present embodiment can be used, for example, to set calibration values for correcting the difference in the degree of focus (the focal state) between the right image and the left image when the user is viewing a parallax image pair which has been recorded. Here, it is assumed that the user wears XR goggles, which is a display device having a left eye display unit and a right eye display unit, to view the parallax image pair. Here, XR is a collective term for VR (virtual reality), AR (augmented reality), and MR (mixed reality).

The left part of FIG. 23A is a perspective view illustrating an example of the external appearance of XR goggles 2300. The XR goggles 2300 are generally worn on an eye region SO of the head, as illustrated in the right part of FIG. 23A. FIG. 23B is a perspective view illustrating an example of the external appearance of the XR goggles 2300 from the side of a wearing surface. FIG. 23C schematically illustrates the positional relationships between the ocular lenses 2301R and 2301L, a right eye display unit 2308R and a left eye display unit 2308L, and the user's right eye 501R and left eye 501L when wearing the XR goggles 2300.

The XR goggles 2300, for example, display the right image obtained by the binocular lens unit 300 in the right eye display unit 2308R and the left image in the left eye display unit 2308L. Because the right image and the left image are a parallax image pair, the user recognizes the right image and the left image as a 3D image by viewing the right image through the ocular lens 302R with the right eye 501R and the left image through the ocular lens 302L with the left eye 501L. Note that the parallax image pair displayed in the XR goggles 2300 is not limited to a pair of images shot by the binocular lens unit 300. For example, stereoscopic viewing is possible even when a right image and a left image shot by a stereo camera are displayed in the right eye display unit 2308R and the left eye display unit 2308L of the XR goggles 2300.

The present embodiment assumes that the focus distance of the right image and the left image constituting the parallax image pair displayed in the XR goggles 2300 can be changed independently. For example, moving image data in which a right image and a left image are recorded in a refocusable format may be played back on a computing device and observed through the XR goggles 2300 connected to the computing device.

FIGS. 24A to 24C are diagrams schematically illustrating a change in an in-focus subject through refocusing processing. FIG. 24A illustrates a state in which a subject 2403 is in focus but subjects 2402 and 2404 are out of focus. The images of the subjects 2402 and 2404 have no subject blur and are located outside the depth of field, and are therefore assumed to be out of focus.

If the image illustrated in FIG. 24A (a still image or a single frame of a moving image) is recorded in a refocusable format, the image can be changed such that the subject 2402 or 2404 is in focus. FIGS. 24B and 24C illustrate images changed so that the subjects 2402 and 2404 are in focus, respectively.

When, for example, the user specifies a position to be brought into focus, the system control unit 218 changes the image so that the specified position is brought into focus. Any publicly-known method can be used to change the in-focus subject through refocusing processing. If a refocusable image is to be shot by the camera 100, the number of photodiodes sharing the microlens 401 may be increased in both the horizontal and vertical directions.

FIG. 25 illustrates examples of a right eye image 2501R and a left eye image 2501L, corresponding to the image illustrated in FIG. 24A. By displaying the right eye image 2501R and the left eye image 2501L in the right eye display unit 2308R and the left eye display unit 2308L of the XR goggles 2300, the user wearing the XR goggles 2300 can feel as though they are present in the scene illustrated in FIG. 24A. Furthermore, by detecting the user's hand movement and mapping that movement to a position in the image, the user can designate the subject 2403 as the subject to be brought into focus by virtually touching the subject 2403.

FIG. 26 is a block diagram illustrating an example of the functional configuration of a computer 2600 that can be used as the computing device in the present embodiment.

A display 2701 displays information on data being processed by an application program, various message menus, and the like, and is constituted by a Liquid Crystal Display (LCD) or the like. The display 2701 may be a touch screen. A display controller 2702 controls the screens displayed in the display 2701. A keyboard 2703 and a pointing device 2704 are used to input text and the like, to point to icons, buttons, and the like in a graphical user interface (GUI), and the like. A CPU 2705 controls the computer 2600 as a whole.

Read Only Memory (ROM) 2706 stores programs to be executed by the CPU 2705, parameters, and the like. Random Access Memory (RAM) 2707 is used as a work area when the CPU 2705 executes various programs, and as a temporary storage region during error processing.

A hard disk drive (HDD) 2708 and a removable media drive (RMD) 2709 function as external storage devices. A removable media drive is a device that reads or writes from or to a removable recording medium, and may be a flexible disk drive, an optical disk drive, a magneto-optical disk drive, a memory card reader, or the like, as well as a removable HDD. A Solid State Drive (SSD) may be provided in addition to or instead of the HDD 2708.

Note that the programs, an OS, application programs such as browsers, data, and libraries, and the like that realize the various functions of the computer 2600 described in the present embodiment are stored in one or more of the ROM 2706, the HDD 2708, and the RMD 2709.

An expansion slot 2710 is a slot for mounting an expansion card that conforms to the Peripheral Component Interconnect (PCI) bus standard, for example. A variety of expansion boards can be attached to the expansion slot 2710, including video capture boards, sound boards, GPIB boards, and the like.

An external IF 2711 is an interface for communicatively connecting the computer 2600 to external devices and is compliant with one or more wired and/or wireless communication standards. The external IF 2711 can have an interface compliant with one or more of wireless LAN, Universal Serial Bus (USB), HDMI (registered trademark), Bluetooth (registered trademark), 4G (LTE), 5G, and the like.

A bus 2712 is constituted by address buses, data buses, and control buses, and connects the above-mentioned units.

The focus calibration function according to the present embodiment will be described next. Here, the focus calibration function for the parallax image pair displayed in the XR goggles 2300 is assumed to be provided by executing an application program that provides the focus calibration function in the computer 2600 described above. However, the system control unit 218 of the camera 100 can also provide the focus calibration function by executing a similar program.

It is assumed here that the data of the parallax image pair (the right image and the left image) is recorded in a refocusable format in a storage device (e.g., the HDD 2708) of the computer 2600. The data of the right image and the left image may be obtained from the camera 100 or another external device through the external IF 2711. Additionally, as illustrated in FIG. 27A, the XR goggles 2300 can be connected to the external IF 2711 of the computer 2600 to display the right image and the left image.

The focus calibration function provided by the computer 2600 displays a parallax image pair 2602 and a calibration guide 2601 in the display 2701.

FIG. 27B illustrates an example of the calibration guide 2601. The calibration guide 2601 has an axis 2610 that indicates a distance range from the near end to infinity. The axis 2610 is provided with scales, with some of the scales indicating values. Here, an indicator 2611, which illustrates a minimum value (the near end), and an indicator 2612, which illustrates a maximum value (infinity), are displayed near the bottom of the axis 2610. Indicators indicating values for some distances between the minimum and maximum values are provided as well.

A mark 2613 indicates a position on the axis 2610 corresponding to the focus distance when the parallax image pair currently displayed was shot. The focus distance at the time of shooting is recorded with the image data as one piece of the information at the time of shooting.

In the example illustrated in FIG. 27B, the mark 2613 indicates 1 m. The image at this time is assumed to be, for example, an image in which the subject 2403 is in focus, illustrated in FIG. 24A. By moving the mark 2613, the user can change the distance indicated by the mark 2613, and can therefore instruct the changed focus distance to the CPU 2705. The user can move the mark 2613 to the desired position by operating the keyboard 2703 or the pointing device 2704, or by making a touch operation on the display 2701.

For example, assume that the user moves the mark 2613 to a position on the axis 2610 pointing to 2 m, as illustrated in FIG. 27C. The CPU 2705 changes the focus distance of the image data according to the position of the mark 2613 after the change. The CPU 2705 can change the focus distance through a method appropriate for the recording method. If a light field image is recorded, a shift operation can be used to change the focus distance. If a group of images having different focus distances are recorded, it is sufficient to extract the image that is in focus at the specified distance (the image that includes the specified distance in the depth of field). Assume that the image illustrated in FIG. 24B is an image at a focus distance of 2 m and the image illustrated in FIG. 24C is an image at a focus distance of 3 m.

Because the right image and the left image are in focus at the distance indicated by the mark 2613, there should be no difference in the degree of focus between the right image and the left image. However, factors such as manufacturing error, age-related deterioration, the environment, and the like of the constituent elements such as the lenses, reflective mirrors, and the like in each of the two imaging optical systems that form the right image and the left image can result in a discrepancy between the degrees of focus of the right image and the left image.

Therefore, a situation may arise where the user feels that the right image and the left image observed through the display 2701, the XR goggles 2300, or the like are in different degrees of focus. In particular, if the degree of focus of one image is lower than the degree of focus of the other image, the two images are displayed adjacent to each other, which makes it easier for the user to notice the difference in the degree of focus. Accordingly, the present embodiment provides a focus calibration function for correcting for the discrepancy between the in-focus state expected by the user for the specified distance and the degree of focus in the displayed image.

FIG. 27D illustrates an example of the display format of the calibration guide 2601 when setting calibration values. As illustrated in FIG. 27A, in the present embodiment, the calibration values for the left image and the right image are set by fine-tuning the focus distance while checking the degree of focus of the parallax image pair 2602 displayed in the display 2701.

FIG. 27D illustrates a state in which the CPU 2705 has changed the display format of the calibration guide 2601 from the state illustrated in FIG. 27C to a mode in which calibration values are set (a calibration mode) in response to an instruction from the user. Therefore, the parallax image pair 2602 currently displayed is the image that the CPU 2705 presents as the image in focus at a subject distance of 2 m.

Here, upon transitioning to the calibration mode, the indicator given on the scale on the axis 2610 is changed from indicating the distance to displaying a numerical value with the current setting value as 0. This is to facilitate understanding of the magnitude and direction of the calibration value. Note that the state indicating the distance may be maintained, as illustrated in FIG. 26C.

Additionally, upon transitioning to the calibration mode, the CPU 2705 displays an indicator 2624, which indicates the current calibration value as a numerical value. Furthermore, the CPU 2705 displays a mark 2623 for setting the calibration value for the right image and a mark 2622 for setting the calibration value for the left image. The user can move the marks 2622 and 2623 by operating the keyboard 2703 or the pointing device 2704, by making a touch operation on the display 2701, or the like.

When an operation for moving the mark 2623 is detected, the CPU 2705 changes the focus distance of the right image in the parallax image pair 2602 according to the movement direction and movement amount from the initial position (0). For example, CPU 2705 changes the focus distance to the infinity direction if movement of the mark 2623 in the + direction is detected, and changes the focus distance to the near end direction if movement of the mark 2623 in the − direction is detected. The amount of change in distance per tick in the scale may be a predetermined constant value. The CPU 2705 changes the focus distance of the left image in the same manner as the right image when an operation for moving the mark 2622 is detected. The user manipulates the marks 2622 and 2623 such that the right image and the left image appear to be in focus at the specified distance.

FIG. 27D illustrates a calibration value of 0 for the left image and a calibration value of −4 for the right image. This indicates that the set distance of the left image does not need to be corrected, and that by adjusting the set distance of the right image to the near end side by the calibration value of −4, the in-focus region of the right image will be perceived in the same manner as the in-focus region of the left image.

When the calibration is complete, the user instructs the computer 2600 to finish the calibration by using the keyboard 2703 or the pointing device 2704, making a touch operation in the display 2701, or the like.

Upon detecting this instruction, the CPU 2705 stores the calibration values set at that time in, for example, the HDD 2708 as application setting values. Additionally, when updating the parallax image pair 2602, the CPU 2705 reflects the calibration value in the distance setting values. Note that the calibration values are not limited to when playing back the image data used for settings, and can also be applied to other image data shot with the same device that shot the stated image data. If a calibration value is set for one frame of moving image data, the calibration can be applied to other frames as well. The calibration values that have already been set may be applied automatically, or may be applied when indicated by the user.

According to the present embodiment, a focus distance calibration function can be provided for parallax image pairs that are recorded in a refocusable format.

Variation

An indicator indicating an overfocus distance may be added to the calibration guide 2601. This makes it possible for the user to easily obtain a pan-focus image. The overfocus distance can be obtained from the focal length and F value of the lens unit recorded with the image data as information at the time of shooting and, for example, the allowable circle of confusion diameter, which is the pixel pitch of the image sensor.

Other Embodiments

In the embodiments described above, the display positions of the marks or the indicators with respect to the right image and the left image may be reversed. Additionally, the form of the graphical user interface (GUI) that constitutes the various indicators and guides is not limited to those illustrated in the drawings. Any form of GUI that can present the same information to the user as the indicators and guides exemplified in the embodiments can be used.

Additionally, the above-described various types of control performed by the system control unit 218 may be carried out by a single piece of hardware, or the control of the apparatus as a whole may be carried out by dividing the processing up among multiple pieces of hardware (e.g., multiple processors or circuits).

Although the foregoing has described exemplary embodiments of the disclosure, the disclosure is not intended to be limited to the specific embodiments, and all variations that do not depart from the essential spirit of the disclosure are intended to be included in the scope of the disclosure. Furthermore, the above-described embodiments are merely embodiments of the disclosure, and different embodiments can be combined as appropriate.

Additionally, although the foregoing embodiments describe a case where the disclosure is applied in the digital camera (an image capture apparatus) as an example, the disclosure is not limited to this example, and can also be applied in any display control device capable of displaying a display item pertaining to focus. In other words, the disclosure can be applied in personal computers and PDAs, mobile telephone terminals and portable image viewers, printer devices including displays, digital photo frames, music players, game consoles, e-book readers, and the like.

The disclosure is not limited to an image capture apparatus body, and can also be applied in a control apparatus that communicates with an image capture apparatus (including a network camera) through wired or wireless communication and remotely controls the image capture apparatus. A smartphone, a tablet PC, a desktop PC, and the like can be given as examples of apparatuses that remotely control the image capture apparatus. The image capture apparatus can be controlled remotely by the control apparatus communicating commands for carrying out various types of operations, settings, and the like to the image capture apparatus on the basis of operations made in the control apparatus, processes carried out by the control apparatus, and the like. Additionally, a live view image shot by the image capture apparatus can be received by the control apparatus through wired or wireless communication and displayed.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An electronic device that controls a display device to perform a live view display based on a captured image, comprising:
   at least one processor; and
   a memory coupled to the at least one processor, the memory having instructions that, when executed by the processor, performs operations as:
   an obtaining unit configured to obtain a first live view image captured through a first optical system and a second live view image captured through a second optical system, wherein the first and second live view images have parallax with each other and wherein optical axes of the first and second optical systems are parallel; and
   a display control unit configured to display a first display item indicating a difference between focus conditions of the first live view image and the second live view image together with the first live view image and the second live view image.

2. The electronic device according to claim 1, wherein the first display item indicates the difference as a relative value and a direction with reference to the focus condition of the first live view image or the focus condition of the second live view image.

3. The electronic device according to claim 2, wherein the first display item indicates the direction as a sign of the relative value and the sign is positive for front focus and negative for back focus.

4. The electronic device according to claim 1, wherein the display control unit does not display the first display item if reliability of one or both of the focus conditions is determined to be low.

5. The electronic device according to claim 1, wherein the display control unit display the first display item if an operational mode of the electronic device is set to an adjustment mode for adjusting a difference in degree of focus between the first optical system and the second optical system.

6. An electronic device that controls a display device to perform a live view display based on a captured image, comprising:

at least one processor; and a memory coupled to the at least one processor, the memory having instructions that, when executed by the processor, performs operations as:

an obtaining unit configured to obtain a first live view image captured through a first optical system and a second live view image captured through a second optical system, wherein the first and second live view images have parallax with each other, wherein optical axes of the first and second optical systems are parallel, and wherein a difference in degree of focus between the first optical system and the second optical system is adjustable according to user operation; and a display control unit configured to display the first live view image with a first display item superimposed on the first live view image and indicating information on a focus condition of the first live view image.

7. The electronic device according to claim 6, wherein a binocular lens unit comprising the first optical system and the second optical system further comprises a first focus ring operable by a user to perform focus adjustment of the first optical system and a second focus ring operable by a user to perform focus adjustment of the second optical system.

8. The electronic device according to claim 6, wherein a binocular lens unit comprising the first optical system and the second optical system further comprises a focus ring operable by a user to perform focus adjustment of the first optical system and the second optical system in parallel.

9. The electronic device according to claim 6, wherein the first display item is superimposed at a position based on the optical axis of the first optical system.

10. The electronic device according to claim 6, wherein the first display item is superimposed at a position around a focus detection region of the first live view image.

11. A method performed by an electronic device for controlling a display device to perform a live view display based on a captured image, comprising:

obtaining a first live view image captured through a first optical system;

obtaining a second live view image captured through a second optical system, wherein the first and second live view images have parallax with each other and wherein optical axes of the first and second optical systems are parallel;

displaying a first display item indicating a difference between focus conditions of the first live view image and the second live view image together with the first live view image and the second live view image.

12. A method performed by an electronic device for controlling a display device to perform a live view display based on a captured image, comprising:

obtaining a first live view image captured through a first optical system;

obtaining a second live view image captured through a second optical system, wherein the first and second live view images have parallax with each other and wherein optical axes of the first and second optical systems are parallel, and wherein a difference in degree of focus between the first optical system and the second optical system is adjustable according to user operation; and displaying the first live view image with a first display item superimposed on the first live view image and indicating information on a focus condition of the first live view image.

13. A non-transitory computer-readable medium that stores a program having instructions executable by a computer, wherein the instructions, when executed by the computer, causes the computer to perform a method comprising:

obtaining a first live view image captured through a first optical system;

obtaining a second live view image captured through a second optical system, wherein the first and second live view images have parallax with each other and wherein optical axes of the first and second optical systems are parallel;

displaying a first display item indicating a difference between focus conditions of the first live view image and the second live view image together with the first live view image and the second live view image.

14. A non-transitory computer-readable medium that stores a program having instructions executable by a computer, wherein the instructions, when executed by the computer, causes the computer to perform a method comprising:

obtaining a first live view image captured through a first optical system;

obtaining a second live view image captured through a second optical system, wherein the first and second live view images have parallax with each other and wherein optical axes of the first and second optical systems are parallel, and wherein a difference in degree of focus between the first optical system and the second optical system is adjustable according to user operation; and displaying the first live view image with a first display item superimposed on the first live view image and indicating information on a focus condition of the first live view image.

\* \* \* \* \*